United States Patent
Rosewarne

(10) Patent No.: US 12,452,463 B2
(45) Date of Patent: Oct. 21, 2025

(54) TOOL SELECTION FOR FEATURE MAP ENCODING VS REGULAR VIDEO ENCODING

(71) Applicants: CANON KABUSHIKI KAISHA, Tokyo (JP); CANON AUSTRALIA PTY LTD, Macquarie Park (AU)

(72) Inventor: Christopher James Rosewarne, Concord (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/554,177

(22) PCT Filed: Mar. 11, 2022

(86) PCT No.: PCT/AU2022/050200
§ 371 (c)(1),
(2) Date: Oct. 5, 2023

(87) PCT Pub. No.: WO2022/213139
PCT Pub. Date: Oct. 13, 2022

(65) Prior Publication Data
US 2024/0236377 A1    Jul. 11, 2024

(30) Foreign Application Priority Data
Apr. 7, 2021    (AU) ............................... 2021202142

(51) Int. Cl.
*H04N 19/70* (2014.01)
*G06V 10/771* (2022.01)
(Continued)

(52) U.S. Cl.
CPC ........... *H04N 19/70* (2014.11); *G06V 10/771* (2022.01); *G06V 10/82* (2022.01); *H04N 19/46* (2014.11)

(58) Field of Classification Search
CPC ...... H04N 19/70; H04N 19/46; G06V 10/771; G06V 10/82
(Continued)

(56) References Cited

U.S. PATENT DOCUMENTS 12,288,567 B2    4/2025  Abbeloos et al.
12,309,398 B2 *  5/2025  Blanch ................. H04N 19/105
(Continued)

FOREIGN PATENT DOCUMENTS

EP        3836035 A1     6/2021
JP      2021505069 A     2/2021
(Continued)

OTHER PUBLICATIONS

Hu et al. ("Sensitivity-Aware Bit Allocation for Intermediate Deep Feature Compression," IEEE Dec. 2020) (Year: 2020).*
(Continued)

*Primary Examiner* — Matthew David Kim
(74) *Attorney, Agent, or Firm* — Canon U.S.A., Inc. IP Division

(57) ABSTRACT

An apparatus for generating first encoded data and second encoded data. The apparatus comprises a determining unit for determining whether the apparatus generates encoded data including encoded data of a feature map based on a neural network. The apparatus also comprise an encoding unit for generating the first encoded data using a plurality of functions for encoding video data, in a case where the apparatus generates the first encoded data in a form of encoded video data not including the encoded data of the feature map. The encoding unit generates the encoded data of the feature map using a first part of the plurality of functions but not using a second part of the plurality of functions, in a case where the apparatus generates the second encoded data including the encoded data of the feature map.

22 Claims, 19 Drawing Sheets

(51) Int. Cl.
   *G06V 10/82* (2022.01)
   *H04N 19/46* (2014.01)
(58) Field of Classification Search
   USPC .................................................. 375/240.12
   See application file for complete search history.

(56) References Cited

U.S. PATENT DOCUMENTS

| | | |
|---|---|---|
| 2003/0108099 A1 | 6/2003 | Nagumo |
| 2011/0069750 A1* | 3/2011 | Chengalvala .......... H04N 19/40 348/180 |
| 2014/0105283 A1* | 4/2014 | Li ........................ H04N 19/126 375/240.03 |
| 2019/0012559 A1 | 1/2019 | Desappan et al. |
| 2020/0293893 A1 | 9/2020 | Georgiadis et al. |
| 2020/0336699 A1 | 10/2020 | Kim et al. |
| 2021/0006784 A1* | 1/2021 | Lim ........................ H04N 19/11 |
| 2021/0090217 A1* | 3/2021 | Jiang ..................... G06T 3/4046 |
| 2021/0158170 A1 | 5/2021 | Jiang |
| 2021/0165765 A1 | 6/2021 | Natanzon |
| 2021/0266565 A1 | 8/2021 | Zhou et al. |
| 2021/0303972 A1 | 9/2021 | Lee |
| 2022/0070482 A1* | 3/2022 | Kang ................... H04N 19/159 |
| 2022/0101494 A1* | 3/2022 | Mardani Korani .......................... G06F 18/21347 |
| 2022/0279187 A1* | 9/2022 | Sim ...................... H04N 19/593 |
| 2022/0398455 A1* | 12/2022 | Dumas ................. H04N 19/436 |
| 2022/0398456 A1* | 12/2022 | Gao ........................ G06V 10/96 |
| 2023/0082561 A1 | 3/2023 | Kim |
| 2023/0095387 A1* | 3/2023 | Dumas ................... H04N 19/46 375/240.26 |
| 2023/0224454 A1* | 7/2023 | Dumas ................. H04N 19/105 375/240.02 |
| 2023/0254507 A1* | 8/2023 | Dumas ................. H04N 19/176 375/240.12 |

FOREIGN PATENT DOCUMENTS

| | | |
|---|---|---|
| WO | 2017/206826 A1 | 12/2017 |
| WO | 2020/238603 A1 | 12/2020 |
| WO | 2020263646 A1 | 12/2020 |
| WO | 2021/050007 A1 | 3/2021 |
| WO | 2021052355 A1 | 3/2021 |

OTHER PUBLICATIONS

Georgios Georgiadis, Accelerating Convolutional Neural Networks via Activation Map Compression, IEEE/CVF Conference on Computer Vision and Pattern Recognition (CVPR), Jun. 15, 2019.

Zhuo Chen, et al., Lossy Intermediate Deep Learning Feature Compression and Evaluation, Proceedings of the 27th ACM International Conference on Multimedia, Oct. 2019.

Ling-Yu Duan, et al., Video Coding for Machines: A Paradigm of Collaborative Compression and Intelligent Analytics, arXiv:2001.03569, Jan. 13, 2020.

Hyomin Choi, et al., Deep Feature Compression for Collaborative Object Detection, 25th IEEE International Conference on Image Processing (ICIP), Sep. 6, 2018.

Zhuo Chen, et al., Data Representation in Hybrid Coding Framework for Feature Maps Compression, IEEE International Conference on Image Processing (ICIP), Sep. 30, 2020.

Yuzhang Hu, et al., Sensitivity-Aware Bit Allocation for Intermediate Deep Feature Compression, 2020 IEEE International Conference on Visual Communications and Image Processing (VCIP), Dec. 1, 2020.

Cohen, R. et al., Lightweight Compression of Neural Network Feature Tensors for Collaborative Intelligence, IEEE International Conference on Multimedia and Expo (ICME), Jun. 9, 2020.

Zhuo Chen et al., Toward Intelligent Sensing: Intermediate Deep Feature Compression, IEEE Transactions on Image Processing, 2020, vol. 29.

Benjamin Bross et al., Versatile Video Coding (Draft 10), Joint Video Experts Team (JVET) of ITU-T SG 16 WP 3 and ISO/IEC JTC 1/SC 29/WG 11, 19th meeting, Jun. 22-Jul. 1, 2020, Doc. No. JVET-S0269.

* cited by examiner

TOOL SELECTION FOR FEATURE MAP ENCODING VS REGULAR VIDEO ENCODING

REFERENCE TO RELATED PATENT APPLICATION

This application is the National Phase application of PCT Application No. PCT/AU2022/050200, filed on Mar. 11, 2022. This application claims the benefit under 35 U.S.C. § 119 of the filing date of Australian Patent Application No. 2021202142, filed Apr. 7, 2021, hereby incorporated by reference in its entirety as if fully set forth herein.

TECHNICAL FIELD

The present invention relates generally to digital video signal processing and, in particular, to a method, apparatus and system for encoding and decoding tensors from a convolutional neural network. The present invention also relates to a computer program product including a computer readable medium having recorded thereon a computer program for encoding and decoding tensors from a convolutional neural network using video compression technology.

BACKGROUND

Video compression is a ubiquitous technology used to support many applications, including applications for transmission and storage of video data. Many video coding standards have been developed and others are currently in development. Recent developments in video coding standardisation have led to the formation of a group called the "Joint Video Experts Team" (JVET). The Joint Video Experts Team (JVET) includes members of two Standards Setting Organisations (SSOs), namely: Study Group 16, Question 6 (SG16/Q6) of the Telecommunication Standardisation Sector (ITU-T) of the International Telecommunication Union (ITU), also known as the "Video Coding Experts Group" (VCEG) and the International Organisation for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) has developed a video compression standard, named 'versatile video coding' (VVC).

Convolution neural networks (CNNs) are an emerging technology addressing, among other things, use cases involving machine vision such as object recognition, object tracking, human pose estimation and action recognition. CNNs typically include many layers, such as convolution layers and fully connected layers, with data passing from one layer to the next in the form of 'tensors'. Weights for each of the layers are determined in a training stage, where a very large amount of training data is passed through the CNN and a determined result is compared to ground truth associated with the training data. A process for updating network weights, such as stochastic gradient descent, is applied to iteratively refine the network weights until the network performs at a desired level of accuracy. Where a convolution stage has a 'stride' greater than one, an output tensor from the convolution has a lower spatial resolution than a corresponding input tensor. Operations such as 'max pooling' also reduce spatial size of the output tensor compared to the input tensor. Max pooling produces an output tensor by dividing the input tensor into groups of data samples (e.g., a 2×2 group of data samples), and from each group selecting a maximum value as output for a corresponding value in the output tensor. The process of executing a CNN with an input and progressively transforming the input into an output is commonly referred to as 'inferencing'.

Generally, a tensor has four dimensions, namely: batch, channels, height and width. The first dimension, 'batch', of size 'one' when inferencing on video data indicates that one frame is passed through a CNN at a time. When training a network, the value of the batch dimension may be increased so that multiple frames are passed through the network before the network weights are updated, according to a predetermined 'batch size'. A multi-frame video may be passed through as a single tensor with the batch dimension increased in size according to the number of frames of a given video. However, for practical considerations relating to memory consumption and access, inferencing on video data is typically performed on a frame-wise basis. The 'channels' dimension indicates the number of concurrent 'feature maps' for a given tensor and the height and width dimensions indicate the size of the feature maps at the particular stage of the CNN. Channel count varies through a CNN according to the network architecture. Feature map size also varies, depending on subsampling occurring in specific network layers.

Input to the first layer of a CNN is an image or video frame, typically resized for compatibility with the dimensionality of the tensor input to the first layer. The dimensionality of tensors is dependent on the CNN architecture, generally having some dimensions relating to input width and height and a further 'channel' dimension.

Slicing a tensor based on channel results in a set of 'feature maps', so-called because each slice of the tensor has some relationship to the corresponding input image, capturing some property such as edges. At layers further from the input to the network, the relationship can be more abstract. The 'task performance' of a CNN is measured by comparing the result of the CNN in performing a task using specific input with a provided ground truth (i.e., 'training data'), generally prepared by humans and intended to indicate a 'correct' result.

Once a network topology is decided, the network weights may be updated over time as more training data becomes available. It is also possible to retrain a portion of a CNN, leaving weights in other portion(s) of the network unchanged. The overall complexity of the CNN tends to be quite high, with large numbers of multiply-accumulate operations being performed and numerous intermediate tensors being written to and read from memory. In some applications, the CNN is implemented entirely in the 'cloud', resulting in a need for high and costly processing power. In other applications, the CNN is implemented in an edge device, such as a camera or mobile phone, resulting in less flexibility but a more distributed processing load.

VVC is anticipated to address ongoing demand for ever-higher compression performance, especially as video formats increase in capability (e.g., with higher resolution and higher frame rate) and to address increasing market demand for service delivery over WANs, where bandwidth costs are relatively high. VVC is implementable in contemporary silicon processes and offers an acceptable trade-off between achieved performance versus implementation cost. The implementation cost may be considered for example, in terms of one or more of silicon area, CPU processor load, memory utilisation and bandwidth. Part of the versatility of the VVC standard is in the wide selection of tools available for compressing video data, as well as the wide range of applications for which VVC is suitable.

Video data includes a sequence of frames of image data, each frame including one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Due to the use of a decorrelated YCbCr signal, the statistics of the luma channel differ markedly from those of the chroma channels. A primary difference is that after quantisation, the chroma channels contain relatively few significant coefficients for a given block compared to the coefficients for a corresponding luma channel block. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. When only luma samples are present, the resulting monochrome frames are said to use a "4:0:0 chroma format".

The VVC standard specifies a 'block based' architecture, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' either for both the luma channel and the chroma channels (a 'shared tree') or a separate tree each for the luma channel and the chroma channels. A coding tree defines a decomposition of the area of the CTU into a set of blocks, also referred to as 'coding blocks' (CBs). When a shared tree is in use a single coding tree specifies blocks both for the luma channel and the chroma channels, in which case the collections of collocated coding blocks are referred to as 'coding units' (CUs) (i.e., each CU having a coding block for each colour channel). The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example, the above-mentioned CUs, as well as 'prediction units' (PUs), and 'transform units' (TUs). A single tree with CUs spanning the colour channels of 4:2:0 chroma format video data result in chroma blocks half the width and height of the corresponding luma blocks. When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU, a prediction unit (PU) of the contents (sample values) of the corresponding area of frame data is generated (a 'prediction unit'). Further, a representation of the difference (or 'spatial domain' residual) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. The transform is applied separably, (i.e. the two-dimensional transform is performed in two passes). The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

VVC features intra-frame prediction and inter-frame prediction. Intra-frame prediction involves the use of previously processed samples in a frame being used to generate a prediction of a current block of data samples in the frame. Inter-frame prediction involves generating a prediction of a current block of samples in a frame using a block of samples obtained from a previously decoded frame. The block of samples obtained from a previously decoded frame is offset from the spatial location of the current block according to a motion vector, which often has filtering applied. Intra-frame prediction blocks can be (i) a uniform sample value ("DC intra prediction"), (ii) a plane having an offset and horizontal and vertical gradient ("planar intra prediction"), (iii) a population of the block with neighbouring samples applied in a particular direction ("angular intra prediction") or (iv) the result of a matrix multiplication using neighbouring samples and selected matrix coefficients. Further discrepancy between a predicted block and the corresponding input samples may be corrected to an extent by encoding a 'residual' into the bitstream. The residual is generally transformed from the spatial domain to the frequency domain to form residual coefficients in a 'primary transform domain, which may be further transformed by application of a 'secondary transform' to produce residual coefficients in a 'secondary transform domain'. Residual coefficients are quantised according to a quantisation parameter, resulting in a loss of accuracy of the reconstruction of the samples produced at the decoder but with a reduction in bitrate in the bitstream.

SUMMARY

It is an object of the present invention to substantially overcome, or at least ameliorate, one or more disadvantages of existing arrangements.

According to one aspect of the present disclosure, there is provided an apparatus for generating first encoded data and second encoded data, the apparatus comprising:
a determining unit for determining whether the apparatus generates encoded data including encoded data of a feature map based on a neural network; and
an encoding unit for generating the first encoded data using a plurality of functions for encoding video data, in a case where the apparatus generates the first encoded data in a form of encoded video data not including the encoded data of the feature map, wherein the encoding unit generates the encoded data of the feature map using a first part of the plurality of functions but not using a second part of the plurality of functions, in a case where the apparatus generates the second encoded data including the encoded data of the feature map.

According to another aspect of the present disclosure, there is provided an apparatus for decoding first encoded data and second encoded data, the apparatus comprising:
a determining unit for determining whether the apparatus decodes encoded data which includes encoded data of a feature map based on a neural network; and
a decoding unit for decoding the first encoded data using a plurality of functions for decoding video data, in a case where the apparatus decodes the first encoded data in a form of encoded video data not including the encoded data of the feature map, wherein the decoding unit decodes the encoded data of the feature map using a first part of the plurality of functions but not using a second part of the plurality of functions, in a case where the apparatus decodes the second encoded data including the encoded data of the feature map.

According to another aspect of the present disclosure, there is provided a method of generating first encoded data and second encoded data, the method comprising:
determining whether the apparatus generates encoded data including encoded data of a feature map based on a neural network;
generating the first encoded data using a plurality of functions for encoding video data, in a case where the apparatus generates the first encoded data in a form of encoded video data not including the encoded data of the feature map; and
generating the encoded data of the feature map using a first part of the plurality of functions but not using a second part of the plurality of functions, in a case where the apparatus generates the second encoded data including the encoded data of the feature map.

According to another aspect of the present disclosure, there is provided a method of decoding first encoded data and second encoded data, the method comprising:
determining whether the apparatus decodes encoded data including encoded data of a feature map based on a neural network;
decoding the first encoded data using a plurality of functions for decoding video data, in a case where the apparatus decodes the first encoded data in a form of encoded video data not including the encoded data of the feature map; and decoding the encoded data of the feature map using a first part of the plurality of functions but not using a second part of the plurality of functions, in a case where the apparatus decodes the second encoded data including the encoded data of the feature map.

According to another aspect of the present disclosure, there is provided a non-transitory computer-readable storage medium which stores a program for executing a method of generating first encoded data and second encoded data, the method comprising:
determining whether the apparatus generates encoded data including encoded data of a feature map based on a neural network;
generating the first encoded data using a plurality of functions for encoding video data, in a case where the apparatus generates the first encoded data in a form of encoded video data not including the encoded data of the feature map; and generating the encoded data of the feature map using a first part of the plurality of functions but not using a second part of the plurality of functions, in a case where the apparatus generates the second encoded data including the encoded data of the feature map.

According to another aspect of the present disclosure, there is provided a non-transitory computer-readable storage medium which stores a program for executing a method of decoding first encoded data and second encoded data, the method comprising:
determining whether the apparatus decodes encoded data including encoded data of a feature map based on a neural network;
decoding the first encoded data using a plurality of functions for decoding video data, in a case where the apparatus decodes the first encoded data in a form of encoded video data not including the encoded data of the feature map; and
decoding the encoded data of the feature map using a first part of the plurality of functions but not using a second part of the plurality of functions, in a case where the apparatus decodes the second encoded data including the encoded data of the feature map.

Other aspects are also disclosed.

BRIEF DESCRIPTION OF THE DRAWINGS

At least one embodiment of the present invention will now be described with reference to the following drawings and an appendix, in which.

DETAILED DESCRIPTION INCLUDING BEST MODE

Figure 1:
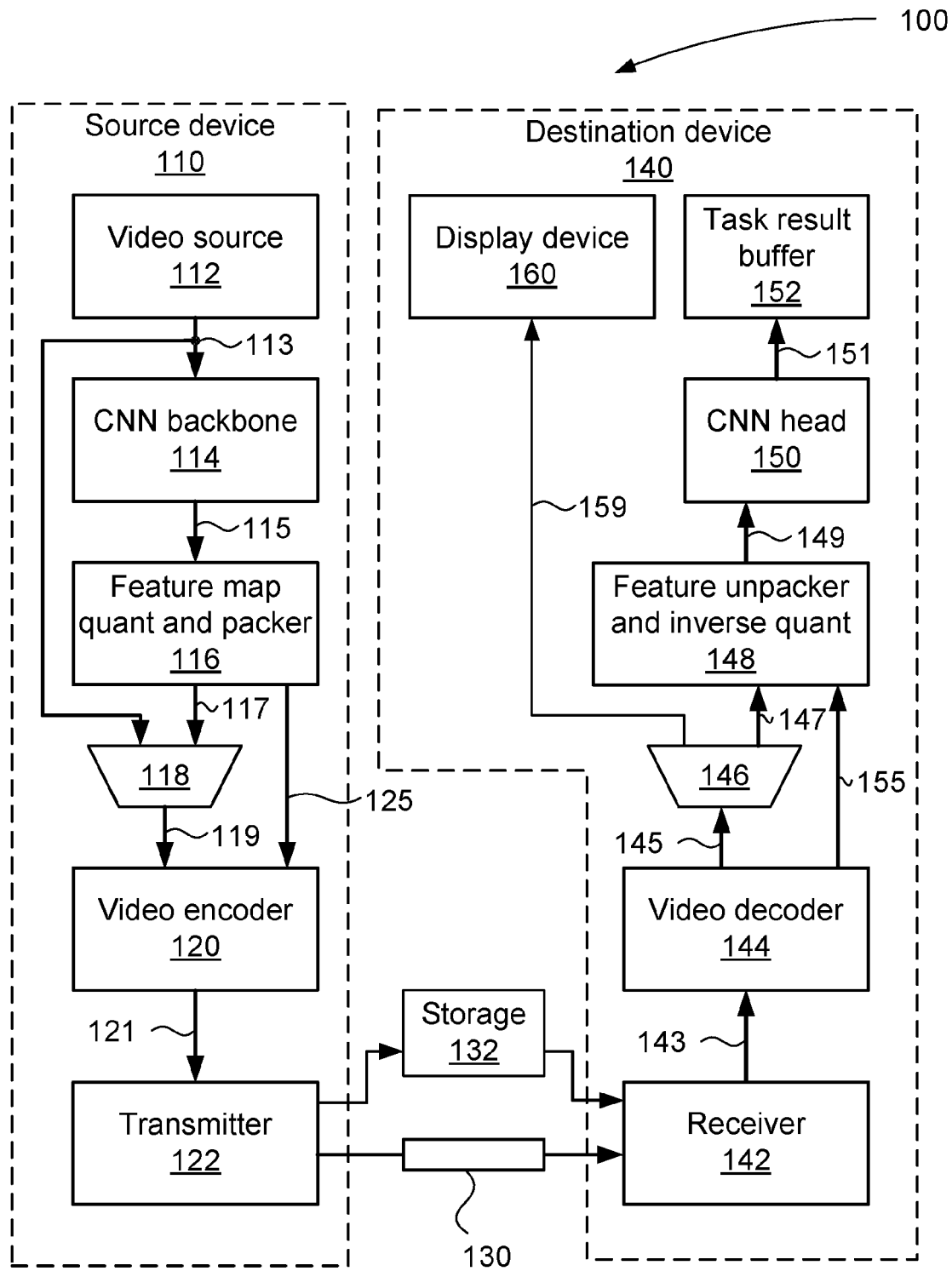
FIG. 1 is a schematic block diagram showing a distributed machine task system.

Where reference is made in any one or more of the accompanying drawings to steps and/or features, which have the same reference numerals, those steps and/or features have for the purposes of this description the same function(s) or operation(s), unless the contrary intention appears.

A distributed machine task system may include an edge device, such as a network camera or smartphone producing intermediate compressed data. The distributed machine task system may also include a final device, such as a server farm based ('cloud') application, operating on the intermediate compressed data to produce some task result. Additionally, the edge device functionality may be embodied in the cloud and the intermediate compressed data may be stored for later processing, potentially for multiple different tasks depending on need.

A convenient form of intermediate compressed data is a compressed video bitstream, owing to the availability of high-performing compression standards and implementations thereof. Video compression standards typically operate on integer samples of some given bit depth, such as 10 bits, arranged in planar arrays. Colour video has three planar arrays, corresponding, for example, to colour components Y, Cb, Cr, or R, G, B, depending on application. CNNs typically operate on floating point data in the form of tensors, which generally have a much smaller spatial dimensionality compared to incoming video data upon which the CNN operates but having many more channels than the three channels typical of colour video data.

Tensors typically have the following dimensions: Frames, channels, height, and width. For example, a tensor of dimensions [1, 256, 76, 136] would be said to contain two-hundred and fifty-six (256) feature maps, each of size 136×76. For video data, inferencing is typically performed one frame at a time, rather than using tensors containing multiple frames.

VVC encoders and decoders include a capability signalling mechanism known as 'constraints'. Early in a bitstream, a set of constraints are present indicating which capabilities of the VVC standard are not used in the bitstream. Constraints are signalled along with 'profile' and 'level' of the bitstream. The profile indicates broadly which set of tools is required to be available to decode the bitstream. Constraints also provide a fine granularity of control of which tools are further constrained in the specified profile. The further constraining of tools is similar to 'sub-profiling', however a sub-profile is defined outside of the VVC standard whereas the general constraint flag semantics are defined within the VVC standard. Depending on the type of data being encoded by the video encoder, defining a subset of tools (e.g. equivalently to defining) a sub-profile, allows the decoder to know before commencing bitstream decoding that a subset of the coding tools of the indicated profile of the bitstream are to be used.

FIG. 1 is a schematic block diagram showing functional modules of a distributed machine task system 100. The system 100 may be used for implementing methods for efficiently packing and quantising feature maps into planar frames for encoding and decoding feature maps from encoded data, such that associated overhead data is not too burdensome and task performance on the decoded feature maps is resilient to changing bitrate of the bitstream.

The system 100 includes a source device 110 for generating encoded data in the form of encoded video information. The system 100 also includes a destination device 140. A communication channel 130 is used to communicate the encoded video information from the source device 110 to the destination device 130. In some arrangements, the source device 110 and destination device 140 may either or both comprise respective mobile telephone handsets (e.g., "smartphones") or network cameras and cloud applications. The communication channel 130 may be a wired connection, such as Ethernet, or a wireless connection, such as WiFi or 5G. Moreover, the source device 110 and the destination device 140 may comprise applications where encoded video data is captured on some computer-readable storage medium, such as a hard disk drive in a file server.

As shown in FIG. 1, the source device 110 includes a video source 112, a CNN backbone 114, a feature map quantiser and packer 116, a multiplexor 118, a video encoder 120 and a transmitter 122. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example, displaying the video output of an operating system and various applications executing upon a computing device (e.g., a tablet computer). Examples of source devices 110 that may include an image capture sensor as the video source 112 include smartphones, video camcorders, professional video cameras, and network video cameras.

The CNN backbone 114 receives the video frame data 113 and performs specific layers of an overall CNN, such as layers corresponding to the 'backbone' of the CNN. The backbone layers of the CNN may produce multiple tensors as output, for example, corresponding to different spatial scales of an input image represented by the video frame data 113. A 'feature pyramid network' (FPN) architecture may result in three tensors, corresponding to three layers, output from the backbone 114, with varying spatial resolution and channel count. The feature map quantiser and packer 116 receives tensors 115, which are output from the CNN backbone 114. The feature map quantiser and packer 116 acts to interface an internal layer of the overall CNN, which is the output of the CNN backbone 114, to the video encoder 120 by quantising floating point values in the tensors 115 into data samples that are packed into frames 119. The resolution of the frames 119 may be based on the total area of the feature maps to be coded and a target aspect ratio. If, during packing, excessive unused areas in the frames 119 occurs, the frame size may be increased (e.g. the height may be increased), so that all feature maps are able to be placed in the frames 119. For example, the resolution of frames 119 may be 2056×1224, and the bit depth of frames 119 may be ten (10) bits. Determining feature map placement in the frames 119 only needs to be performed when the dimensions of the tensors 115 are established. Slicing the tensors 115 along the channel dimension results in extracting one feature map per channel, where the feature maps of a given tensor have a specific size that is determined from additional dimensions of the tensor. Where an FPN is used, multiple tensors per incoming frame are produced including multiple sets of feature maps, each set of feature maps having a different spatial resolution. Feature maps of all layers are packed into planar video frames, such as packed feature map frames 117. The multiplexor 118 selects the packed feature map frames 117 if the source device 110 is configured to encode feature maps or the frame data 113 if the source device 110 is configured to encode video data, outputting frames 119 to an encoding unit in the form of the video encoder 120. The selection between feature maps and regular video data is encoded in the bitstream using a 'frame_type' syntax element in a metadata SEI message. The metadata SEI message is described with reference to Appendix A. The frames 119 are input to the video encoder 120 where lossy compression is applied to the frames 119 to produce the bitstream 121. The bitstream 121 is supplied to the transmitter 122 for transmission over the communications channel 130 or the bitstream 121 is written to storage 132 for later use.

After conversion to tensors by the CNN backbone 114, the content of the resulting feature maps can no longer identify individuals that would be clearly identifiable in the video data 113. Storage of the feature maps (e.g. in compressed form), using the storage 132 may be more secure from a user privacy point of view, particularly in relation to European General Data Protection Regulation (GDPR) requirements for pseudonymisation or anonymisation.

The source device 110 supports a particular network for the CNN backbone 114. However, the destination device 140 may use one of several networks for the head CNN 150. In this way, partially processed data in the form of packed feature maps may be stored for later use in performing various tasks without needing to again perform the operation of the CNN backbone 114. The video encoder 120 uses a particular set of coding tools (or 'profile') of VVC to encode the frame data 119.

The bitstream 121 is transmitted by the transmitter 122 over the communication channel 130 as encoded video data (or "encoded video information"). The bitstream 121 can in some implementations be stored in the storage 132, where the storage 132 is a non-transitory storage device such as a "Flash" memory or a hard disk drive, until later being transmitted over the communication channel 130 (or in-lieu of transmission over the communication channel 130). For example, encoded video data may be served upon demand to customers over a wide area network (WAN) for a video streaming application.

The destination device 140 includes a receiver 142, a video decoder 144, a demultiplexor 146, a feature map unpacker and inverse quantiser 148, a CNN head 150, a CNN task 152, and a display device 160. The receiver 142 receives encoded video data from the communication channel 130 and passes received video data to the video decoder 144 as a bitstream (indicated by an arrow 143). The video decoder 144 then outputs decoded frame data (indicated by an arrow 145) to the demultiplexor 146. Decoded metadata 155 is also extracted from the bitstream 143 by the video decoder 144 and passed to a feature map unpacker and inverse quantiser 148. The decoded metadata 155 is typically obtained from a 'supplementary enhancement information' (SEI) message 1413 (see FIG. 14) present in the bitstream 143. Appendix A shows example syntax for the decoded metadata 155 along with semantics of each example syntax element. The decoded metadata 155 may be present and decoded from the bitstream on every frame. The decoded metadata 155 may be present and decoded less frequently than on every frame. For example, the decoded metadata 155 may be present and decoded only on intra pictures in the bitstream 143. When the decoded metadata 155 is absent for a given frame, most recently available metadata is used. If the destination device 140 is configured to perform a CNN task, as indicated by a 'frame_type' syntax element in the SEI message 1413 of the bitstream 143, the frame data 145 is output as feature map frame data 147 to the feature map unpacker and inverse quantiser 148. Otherwise, if the destination device 140 is configured to perform decoding of video data, the frame data 145 is output as frame data 159 and supplied to a display device 160 for display as a video. The feature map unpacker and inverse quantiser outputs tensors 147, which are supplied to the CNN head 150. The CNN head 150 performs the later layers of the task that began with the CNN backbone 114 to produce a task result 151, which is stored in a task result buffer 152. Examples of the display device 160 include a cathode ray tube, a liquid crystal display, such as in smartphones, tablet computers, computer monitors or in standalone television sets. It is also possible for the functionality of each of the source device 110 and the destination device 140 to be embodied in a single device, examples of which include mobile telephone handsets and tablet computers and cloud applications.

Figure 2A:
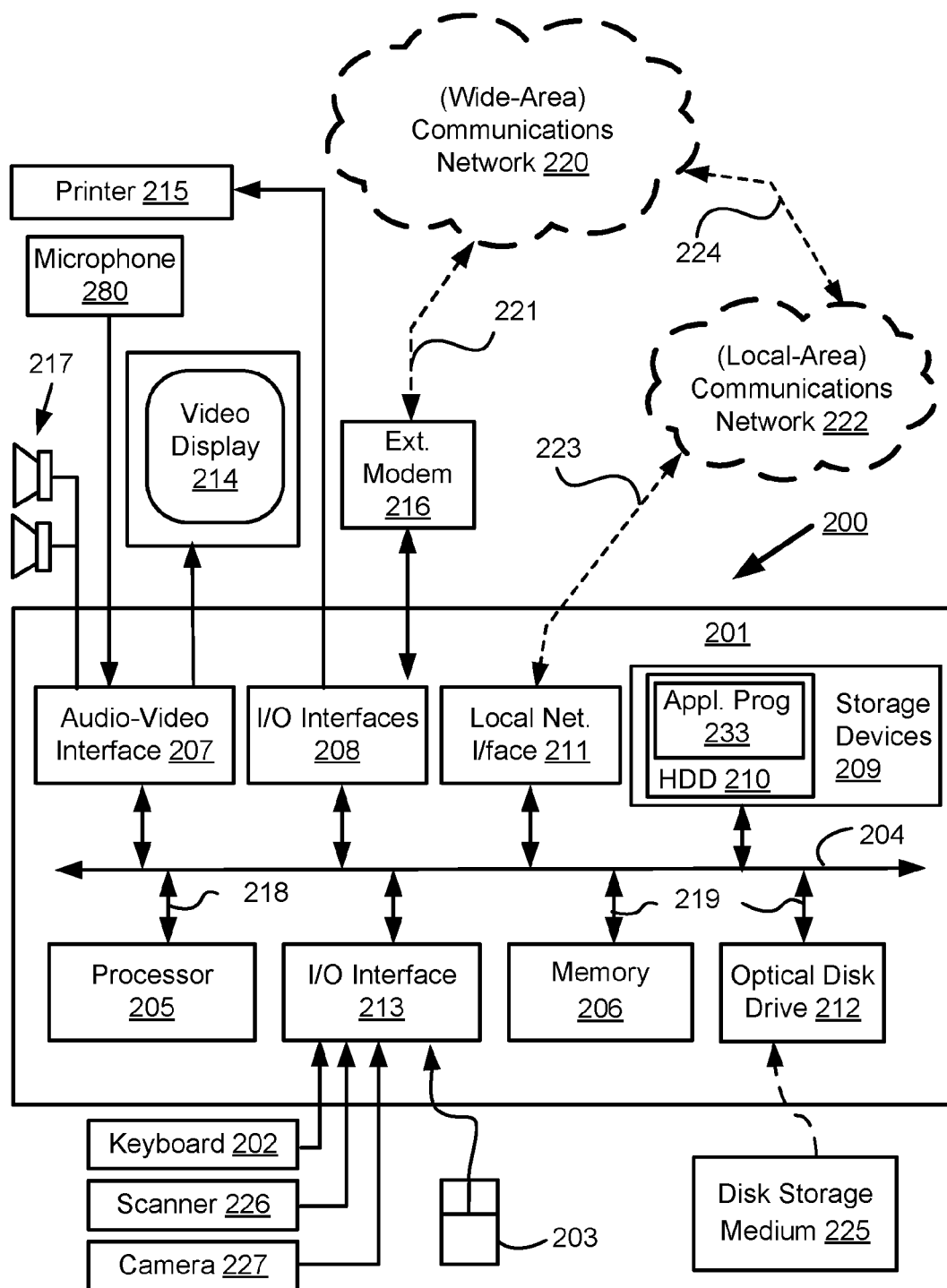
FIGS. 2A and 2B form a schematic block diagram of a general purpose computer system upon which the distributed machine task system of FIG. 1 may be practiced.

Notwithstanding the example devices mentioned above, each of the source device 110 and destination device 140 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 160, and loudspeakers 217. An external Modulator-Demodulator (Modem) transceiver device 216 may be used by the computer module 201 for communicating to and from a communications network 220 via a connection 221. The communications network 220, which may represent the communication channel 130, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 142 and the communication channel 130 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 122 and the receiver 142 and communication channel 130 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 140 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 120 and the video decoder 144, as well as methods described below, may be implemented using the computer system 200. In particular, the video encoder 120, the video decoder 144 and methods to be described, may be implemented as one or more software application programs 233 executable within the computer system 200. In particular, the video encoder 120, the video decoder 144 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the source device 110 and the destination device 140 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
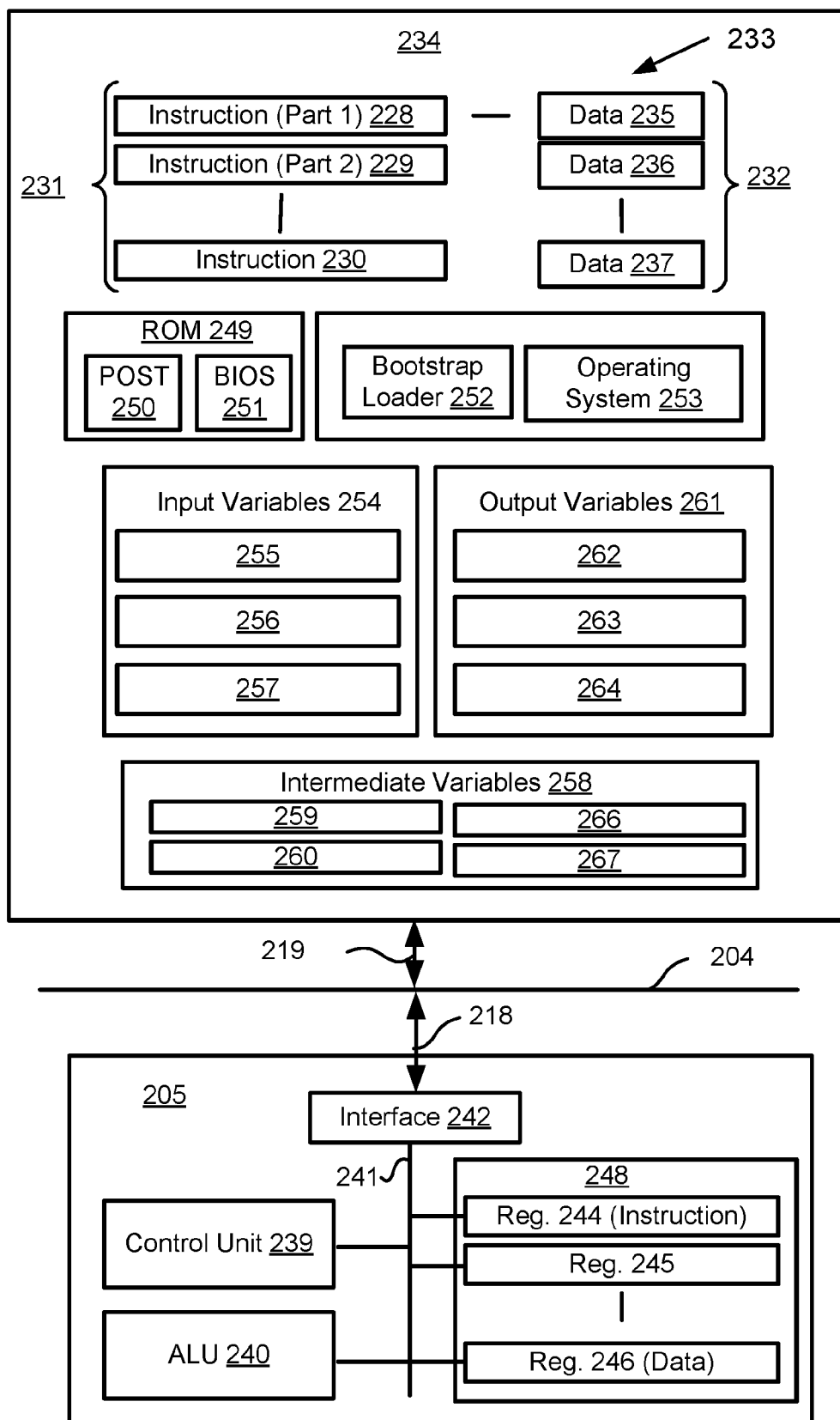

FIG. 2B is a detailed schematic block diagram of the processor 205 and a "memory" 234. The memory 234 represents a logical aggregation of all the memory modules (including the storage devices 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A need to be used properly so that each process can run effectively. Accordingly, the aggregated memory 234 is not intended to illustrate how particular segments of memory are allocated (unless otherwise stated), but rather to provide a general view of the memory accessible by the computer system 200 and how such memory is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 120, the video decoder 144 and the described methods may use input variables 254, which are stored in the memory 234 in corresponding memory locations 255, 256, 257. The video encoder 120, the video decoder 144 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

- a fetch operation, which fetches or reads an instruction 231 from a memory location 228, 229, 230;
- a decode operation in which the control unit 239 determines which instruction has been fetched; and
- an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods of FIGS. 15, 16, 17, and 18, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3A:
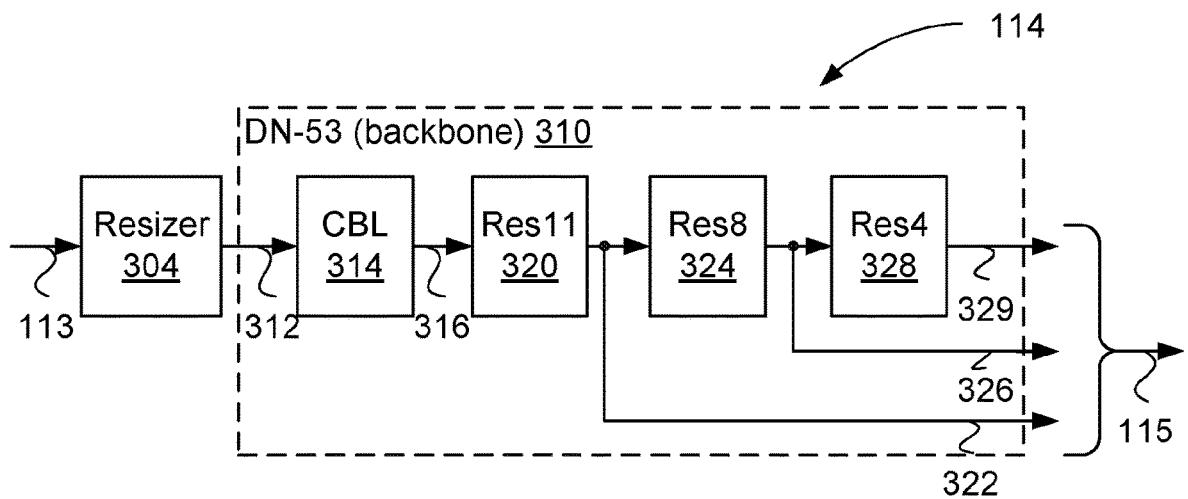
FIG. 3A is a schematic block diagram showing functional modules of a backbone portion of a CNN.

FIG. 3A is a schematic block diagram showing functional modules of a backbone portion 310 of a CNN, which may serve as the CNN backbone 114. The backbone portion 114 is sometimes referred to as 'DarkNet-53', although different backbones are also possible, resulting in a different number of and dimensionality of layers of the tensors 115 for each frame. A 'backbone_id' syntax element in the SEI message 1413, described with reference to FIG. 14 and Appendix A, indicates the type of backbone. Where the type of backbone is unknown, the tensor dimensionality is specified using a feature map count ("fm_cnt") for each layer and feature map dimensions ("fm_width" and "fm_height") for each layer.

As seen in FIG. 3A, the video data 113 is passed to a resizer module 304 which resizes the frame to a resolution suitable for processing by the CNN backbone 310, producing resized frame data 312. If the resolution of the frame data 113 is already suitable for the CNN backbone 310 then operation of the resizer module 304 is not needed. The resized frame data 312 is passed to a convolutional batch normalisation leaky rectified linear (CBL) module 314 to produce tensors 316. The CBL 314 contains modules as described with reference to a CBL module 360 as shown in FIG. 3D.

The CBL module 360 takes as input a tensor 361, which is passed to a convolutional layer 362 to produce tensor 363. When the convolutional layer 362 has a stride of one, the tensor 363 has the same spatial dimensions as the tensor 361. When the convolution layer 362 has a larger stride, such as two, the tensor 363 has smaller spatial dimensions compared to the tensor 361, for example, halved in size for the stride of two. Regardless of the stride, the size of channel dimension of the tensor 363 may vary compared to the channel dimension of the tensor 361 for a particular CBL block. The tensor 363 is passed to a batch normalisation module 364 which outputs a tensor 365. The batch normalisation module 364 normalises the input tensor 363, applies a scaling factor and offset value to produce the output tensor 365. The scaling factor and offset value are derived from a training process. The tensor 365 is passed to a leaky rectified linear activation ("LeakyReLU") module 366 to produce a tensor 367. The module 366 provides an 'activation function' whereby positive values in the tensor are passed through and negative values are severely reduced in magnitude, for example, to 0.1× their former value.

The tensor 316 is passed from the CBL block 314 to a residual block 11 module 320, containing a concatenation of 11 residual units internally.

Figure 3B:
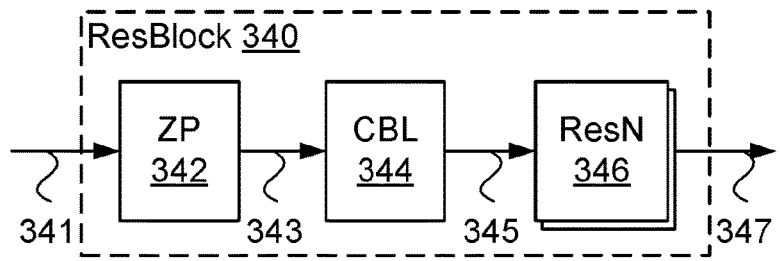
FIG. 3B is a schematic block diagram showing a residual block of FIG. 3A.
Figure 3C:
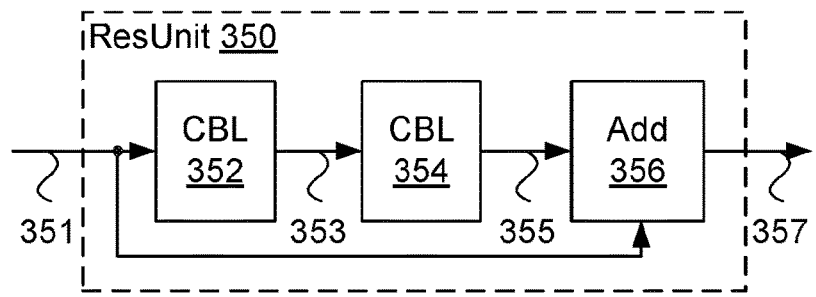
FIG. 3C is a schematic block diagram showing a residual unit of FIG. 3A.
Figure 3D:
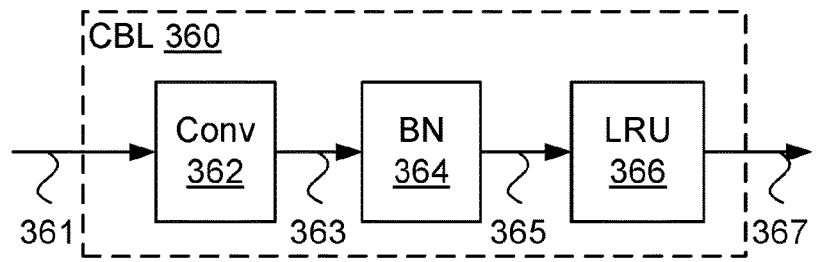
FIG. 3D is a schematic block diagram showing a CBL module of FIG. 3A.

A residual block is described with reference to a ResBlock 340 as shown in FIG. 3B. The ResBlock 340 receives a tensor 341, which is zero-padded by a zero padding module 342 to produce a tensor 343. The tensor 343 is passed to a CBL module 344 to produce a tensor 345. The tensor 345 is passed to a residual unit 346, of which the residual block 340 contains a series of concatenated residual units. The last residual unit of the residual units 346 outputs a tensor 347. A residual unit is described with reference to a ResUnit 350 as seen in FIG. 3C. The ResUnit 350 takes a tensor 351 as input, which is passed to a CBL module 352 to produce a tensor 353. The tensor 353 is passed to a second CBL unit 354 to produce a tensor 355. An add module 356 sums the tensor 355 with the tensor 351 to produce a tensor 357. The add module 356 may also be referred to as a 'shortcut' as the input tensor 351 substantially influences the output tensor 357. For an untrained network, ResUnit 350 acts to pass-through tensors. As training is performed, the CBL modules 352 and 354 act to deviate the tensor 357 away from the tensor 351 in accordance with training data and ground truth data.

The Res11 module 320 outputs a tensor 322, which is output from the backbone module 310 as one of the layers and also provided to a Res8 module 324. The Res8 module 324 is a residual block (i.e., 340), which includes eight residual units (i.e. 350). The Res8 module 324 produces a tensor 326, which is passed to a Res4 module 328 and also output from the backbone module 310 as one of the layers. The Res4 module is a residual block (i.e., 340), which includes four residual units (i.e. 350). The Res4 module 324 produces a tensor 329 which is output from the backbone module 310 as one of the layers. Collectively, the layer tensors 322, 326, and 329 are output as tensors 115. The backbone CNN 310 may take as input a video frame of resolution 1088×608 and produce three tensors, corresponding to three layers, with the following dimensions: [1, 256, 76, 136], [1, 512, 38, 68], [1, 1024, 19, 34]. Although the overall CNN depicted in FIGS. 3 and 9 may be divided as shown, other divisions of the overall CNN are also possible. Tensors output from the first convolution in CBL blocks 912, 926, and 940 (i.e. tensor 363 in each respective CBL module) may be tapped as output from the backbone, in which case the upscaler modules 922 and 936 and the first convolution of CBL modules 912, 926, and 940 are included in the backbone CNN 310. The resulting dimensionality of the tensors is [1, 512, 34, 19], [1, 256, 68, 38], [1, 128, 136, 76]. When all layers and operations of the YOLOv3 network are enumerated, tapping tensor 363 at CBL modules 912, 926, and 940 respectively corresponds with tapping tensors at 75th module, the 90th module, and 105th module in the YOLOv3 network. The resulting tensors have half the number of feature maps at each resolution compared to the "Darknet-53" output (i.e. 322, 326, and 329).

Figure 4:
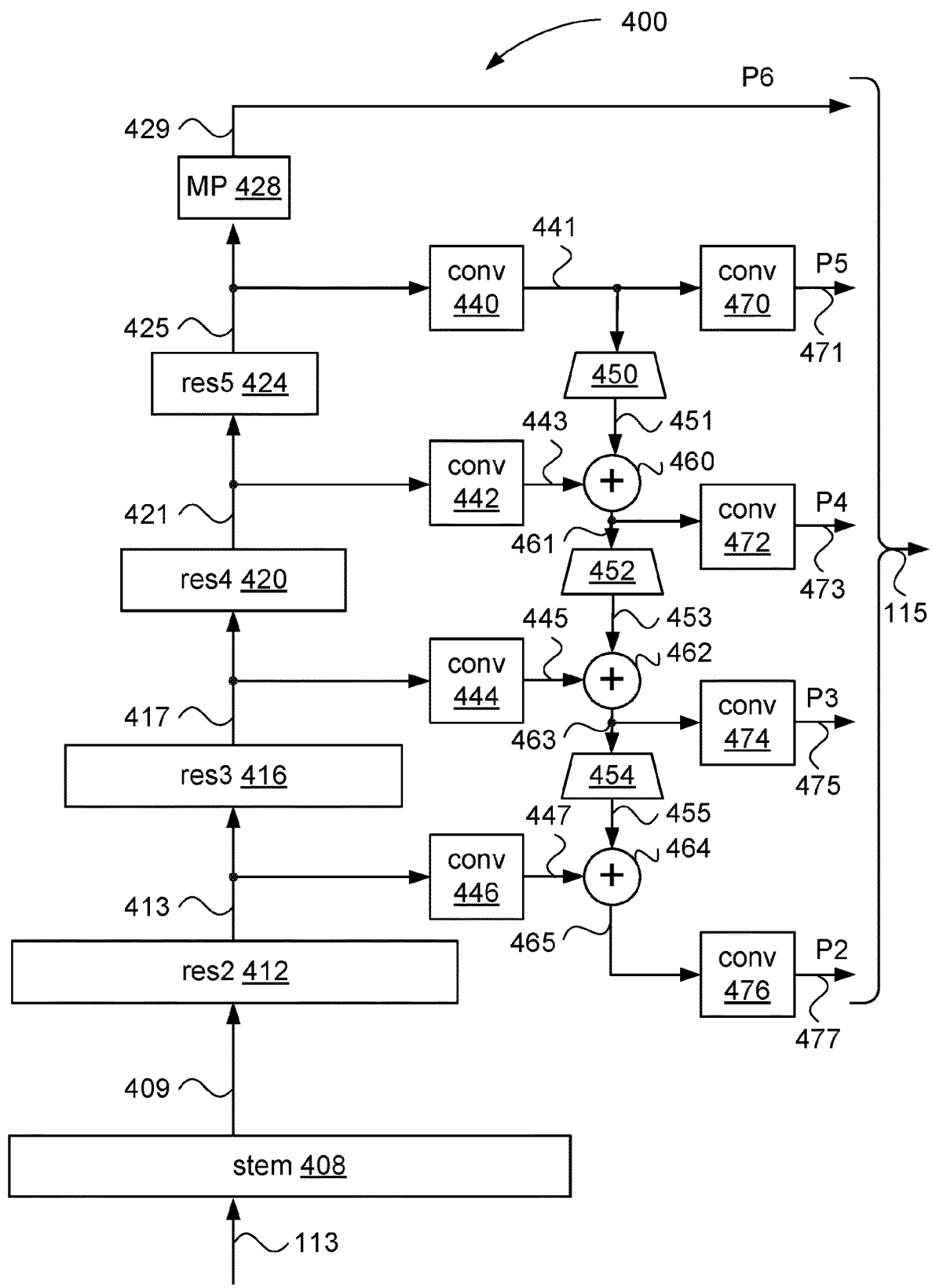
FIG. 4 is a schematic block diagram showing functional modules of an alternative backbone portion of a CNN.

FIG. 4 is a schematic block diagram showing functional modules of an alternative backbone portion 400 of a CNN, which may serve as the CNN backbone 114. The backbone portion 400 implements a residual network with feature pyramid network ('ResNet FPN') and is an alternative to the CNN backbone 114. Frame data 113 is input and passes through a stem network 408, a res2 module 412, a res3 module 416, a res4 module 420, a res5 module 424, and a max pool module 428 via tensors 409, 413, 417, 425, with the max pool module 428 producing tensor 429 as output. The stem network 408 includes a 7×7 convolution with a stride of two (2) and a max pooling operation. The res2 module 412, the res3 module 416, the res4 module 420, and the res5 module 424 perform convolution operations, LeakyReLU activations. Each module 421, 416, 420 and 424 also performs one halving of the resolution of the processed tensors via a stride setting of two. The tensors 409, 413, 417, and 425 are passed to 1×1 lateral convolution modules 440, 442, 444, and 446 to produce tensors 441, 443, 445, 447. The tensor 441 is passed to a 3×3 output convolution module 470, which produces an output tensor P5 471. The tensor 441 is also passed to upsampler module 450 to produce an upsampled tensor 451. A summation module 460 sums the tensors 443 and 451 to produce a tensor 461, which is passed to an upsampler module 452 and a 3×3 lateral convolution module 472. The module 472 outputs a P4 tensor 473. The upsampler module 452 produces an upsampled tensor 453. A summation module 462 sums tensors 445 and 453 to produce a tensor 463, which is passed to a 3×3 lateral convolution module 474 and an upsampler module 454. The module 474 outputs a P3 tensor 475. The upsampler module 454 outputs an upsampled tensor 455. A summation module 464 sums the tensors 447 and 455 to produce tensor 465, which is passed to a 3×3 lateral convolution module 476. The module 476 outputs a P2 tensor 477. The upsampler modules 450, 452, and 454 use nearest neighbour interpolation for low computational complexity. The tensors 429, 471, 473, 475, and 477 form the output tensor 115 of the CNN backbone 400.

Figure 5:
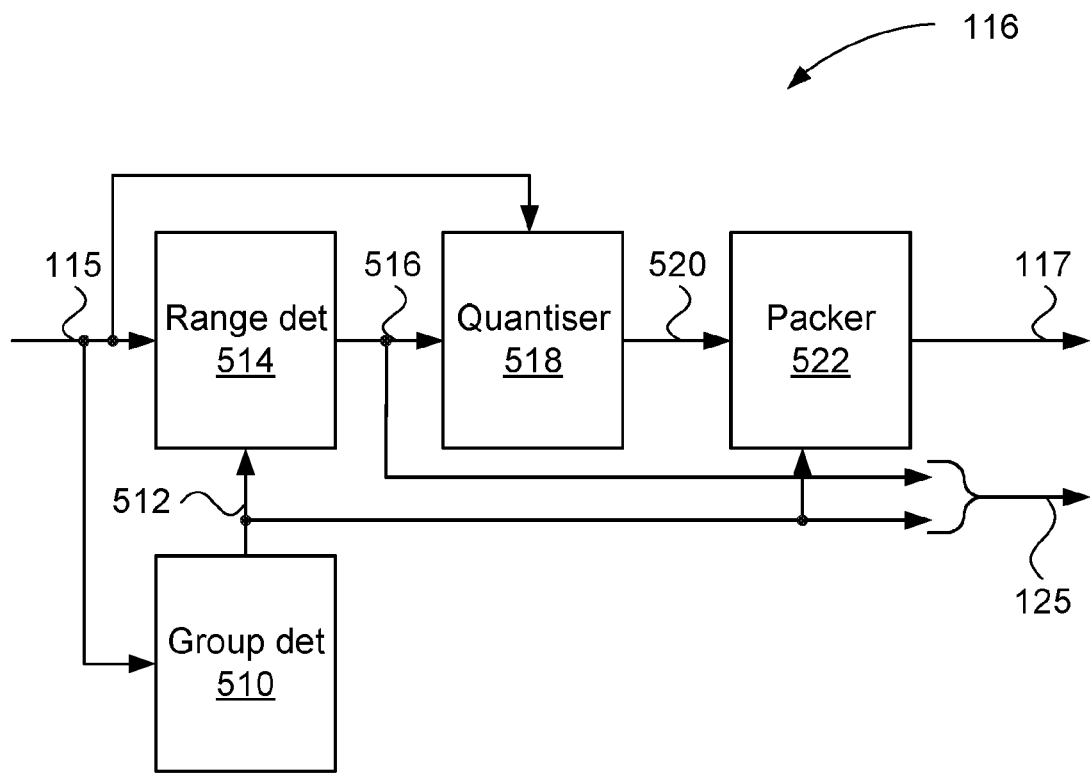
FIG. 5 is a schematic block diagram showing a feature map quantiser and packer as part of a distributed machine task system.

FIG. 5 is a schematic block diagram showing a feature map quantiser and packer 116 as part of a distributed machine task system 100. The tensors 115 from the CNN backbone 114 are input to a group determiner module 510, a range determiner module 514, and a quantiser module 518. In other words, the quantiser module 518 implements a mapping function or transfer function from floating point values to integer values. The group determiner module 510 assigns the feature maps (channels) of the input tensors 115 into feature map groups 512, based either on a predetermined criteria or on some measure of the data present in the tensors 115. The feature map groups 512 may span tensors of different layers or may be confined to individual layers. The feature map groups 512 are passed to a range determiner module 514 and output as part of metadata 125. The range determiner module 514 determines, for each group, a quantisation range indicating the maximum magnitude value present in the feature maps belonging to the respective group, resulting in producing quantisation ranges 516. The range determiner module 514 may determine new quantisation ranges on every frame, or may determine new quantisation ranges less frequently, for example, only on intra pictures.

The bitstream 121 includes a 'qr_update' flag in metadata (see Appendix A) indicating whether the quantisation ranges were updated or not. A single quantisation range may be used to represent the maximum magnitude of any value prior to quantisation within the feature maps of the group to which the quantisation range belongs. In another arrangement, a separate quantisation range for the maximum positive value within the feature map group and the maximum negative value within the feature map are used, resulting in an asymmetric quantisation range, with two values per group.

The tensors 115 generally have 32-bit floating-point precision values and so each quantisation range is also a floating point value. Other floating point precisions are possible, such as 16-bit and 8-bit, and various allocations of bits to the exponent and fraction portions of the floating point values are also possible.

The quantisation ranges 516 are passed to a quantiser module 518 and output as part of the metadata 125. The quantiser module 518 quantises each feature map into sample values in two stages. Firstly, the quantisation range of the feature map group to which the feature map belongs is used to normalise the feature map values, resulting in values in a range from [−1, 1]. Secondly, the normalised feature map values are scaled into a sample range corresponding to the bit-depth of the video encoder 120. For 10-bit operation, the normalised feature maps are multiplied by the feature map groups 512, then an offset of the feature map groups 512 is added and the sum is converted to integer precision and output as integerised feature maps 520. The multiplication and addition operation results in utilisation of at least one value at the minimum or maximum allowed sample value (i.e. zero (0) or one-thousand and twenty-three (1023) for 10-bit video) among the feature maps of a given feature map group. To provide some resilience to overshoot that may occur at the output of the video decoder 144, the multiplicative factor applied to the normalised feature maps may be reduced compared to the maximum possible multiplicative factor that could be used without introducing clipping. For regular video represented in YCbCr colour space, a 'video range' of sixteen (16) to two-hundred and thirty-five (235) or 8-bit video data and sixty-four (64) to nine-hundred and forty (940) for 10-bit video data is defined. Accordingly, a reduction of the multiplicative factor to 7/8 of the full value can be applied, resulting in a similar sample range as seen in the video range of YCbCr video data. The resulting multiplicative factor would be 7/8× (1<<(bit_depth−1)). The offset factor used to shift the negative tensor values into a positive range is left at the half-way point, i.e. 1<<(bit_depth−1), corresponding to the default predictor for unavailable reference samples for intra-prediction, as described with reference to FIGS. 6 and 7. If the integer value produced from quantisation exceeds the range permitted by the bit depth of samples in the frame, clipping is applied to ensure the integer value remains within the bit depth of samples in the frame. The integerised feature maps 520 are passed to a packer module 522, which produces a packed feature map frame 117 including each feature map of the integerised feature maps 520 arranged according to a packing format. Packing formats are described further with reference to FIGS. 11-13. The resulting packed feature map frame 117 is passed to the video encoder 120 via the multiplexor 118.

Figure 6:
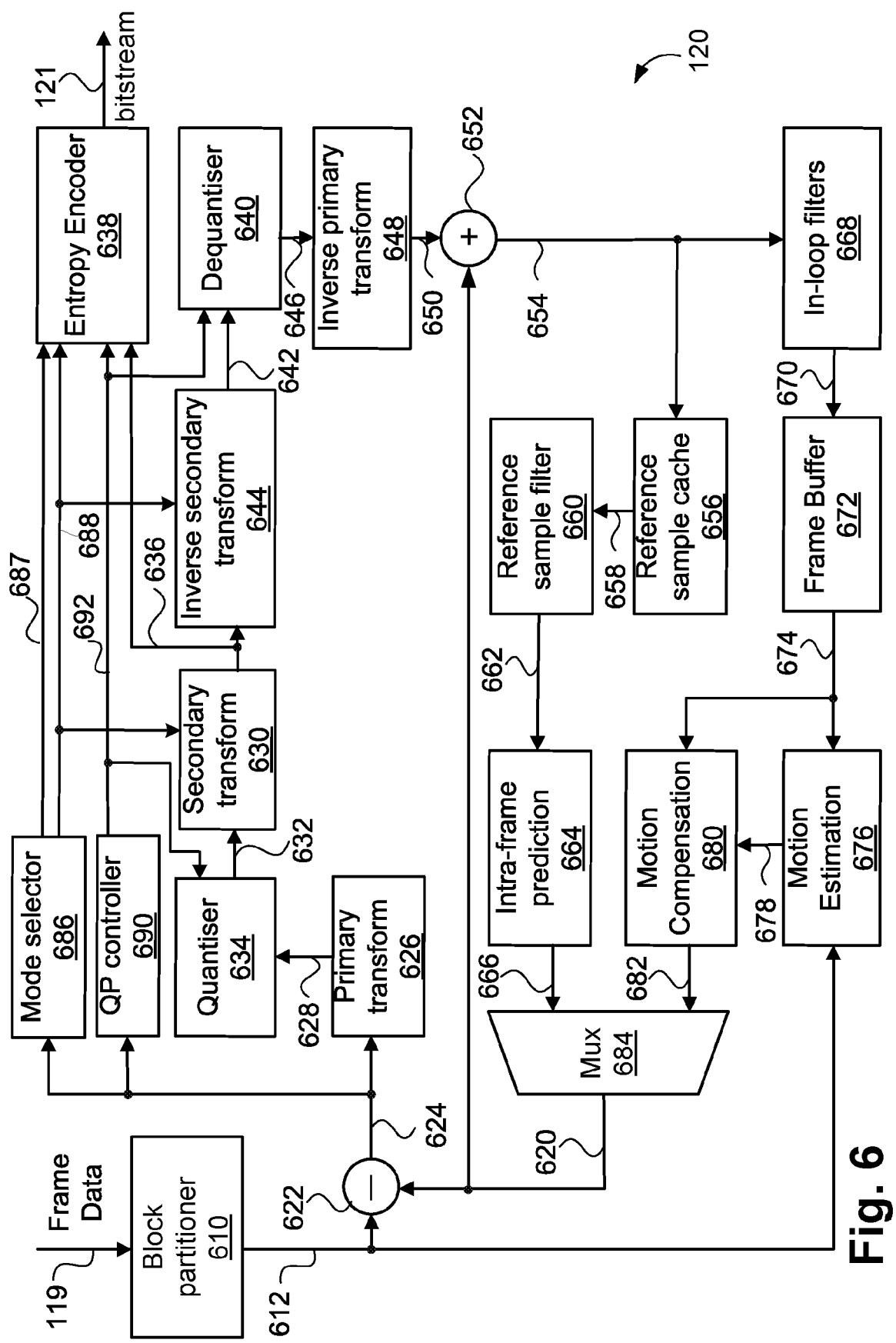
FIG. 6 is a schematic block diagram showing functional modules of a video encoder.
Figure 7:
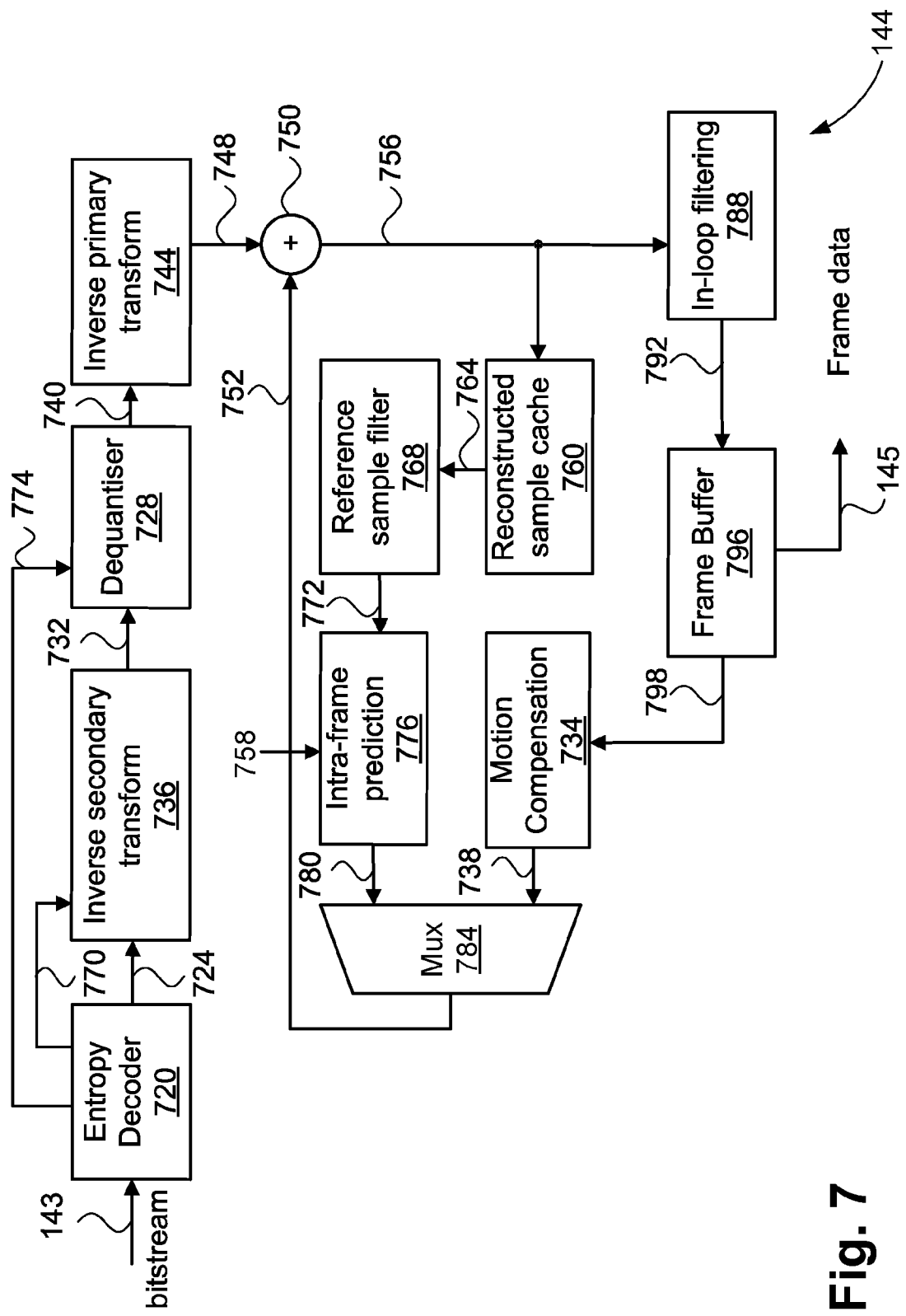
FIG. 7 is a schematic block diagram showing functional modules of a video decoder.

FIG. 6 is a schematic block diagram showing functional modules of the video encoder 120. FIG. 7 is a schematic block diagram showing functional modules of the video decoder 144. Generally, data passes between functional modules within the video encoder 120 and the video decoder 144 in groups of samples or coefficients, such as divisions of blocks into sub-blocks of a fixed size, or as arrays. The video encoder 120 and video decoder 144 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 120 and video decoder 144 may be implemented by a combination of dedicated hardware and software executable within the computer system 200. The video encoder 120, the video decoder 144 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 120 comprises modules 610-690 and the video decoder 144 comprises modules 720-796 which may each be implemented as one or more software code modules of the software application program 233.

Although the video encoder 120 of FIG. 6 is an example of a versatile video coding (VVC) video encoding pipeline, other video codecs may also be used to perform the processing stages described herein. The video encoder 120 receives frame data 119, such as a series of frames, each frame including one or more colour channels. The frame data 119 may be in any chroma format and bit depth supported by the profile in use, for example 4:0:0, 4:2:0 for the "Main 10" profile of the VVC standard, at eight (8) to ten (10) bits in sample precision. A block partitioner 610 firstly divides the frame data 119 into CTUs, generally square in shape and configured such that a particular size for the CTUs is used. The maximum enabled size of the CTUs may be 32×32, 64×64, or 128×128 luma samples for example, configured by a 'sps_log 2_ctu_size_minus5' syntax element present in the 'sequence parameter set'. The CTU size also provides a maximum CU size, as a CTU with no further splitting will contain one CU. The block partitioner 610 further divides each CTU into one or more CBs according to a luma coding tree and a chroma coding tree. The luma channel may also be referred to as a primary colour channel. Each chroma channel may also be referred to as a secondary colour channel. The CBs have a variety of sizes, and may include both square and non-square aspect ratios. However, in the VVC standard, CBs, CUs, PUs, and TUs always have side lengths that are powers of two. Thus, a current CB, represented as 612, is output from the block partitioner 610, progressing in accordance with an iteration over the one or more blocks of the CTU, in accordance with the luma coding tree and the chroma coding tree of the CTU. CUs or CBs are produced by recursively splitting CTUs using quadtree splits (split into four sub-regions arranged as 2×2 subdivision of the parent area), binary splits (split either horizontally or vertically into two equal-sized sub-regions of the parent area), and ternary splits (split either horizontally or vertically into three sub-regions with a 1:2:1 area ratio).

Although operation is generally described on a CTU-by-CTU basis, the video encoder 120 and the video decoder 144 may operate on a smaller-sized region to reduce memory consumption. For example, each CTU may be divided into smaller regions, known as 'virtual pipeline data units' (VPDUs) of size 64×64. The VPDUs form a granularity of data that is more amenable to pipeline processing in hardware architectures where the reduction in memory footprint reduces silicon area and hence cost, compared to operating on full CTUs. When the CTU size is 128×128, restrictions on allowed coding trees are in place to ensure that processing of one VPDU is fully completed before progressing to the next VPDU. For example, at the root node of the coding tree of a 128×128 CTU, ternary splitting is prohibited as the resulting CUs (such as 32×128/128×32 or further decompositions thereof) could not be processed with the required progression from one 64×64 region to a subsequent 64×64 region. When the CTU size is 64×64, regardless of the coding tree selected by the encoder, processing necessarily completes one 64×64 region before progressing to the next 64×64 region (i.e. from one CTU to the next).

The CTUs resulting from the first division of the frame data 119 may be scanned in raster scan order and may be grouped into one or more 'slices'. A slice may be an 'intra' (or 'I') slice. An intra slice (I slice) indicates that every CU in the slice is intra predicted. Generally, the first picture in a coded layer video sequence (CLVS) contains only I slices, and is referred to as an 'intra picture'. The CLVS may contain periodic intra pictures, forming 'random access points' (i.e., intermediate frames in a video sequence upon which decoding can commence). Alternatively, a slice may be uni- or bi-predicted ('P' or 'B' slice, respectively), indicating additional availability of uni- and bi-prediction in the slice, respectively.

When a chroma format other than 4:0:0 is in use, in an I slice, the coding tree of each CTU may diverge below the 64×64 level into two separate coding trees, one for luma and another for chroma. Use of separate trees allows different block structure to exist between luma and chroma within a luma 64×64 area of a CTU. For example, a large chroma CB may be collocated with numerous smaller luma CBs and vice versa. In a P or B slice, a single coding tree of a CTU defines a block structure common to luma and chroma. The resulting blocks of the single tree may be intra predicted or inter predicted.

For each CTU, the video encoder 120 operates in two stages. In the first stage (referred to as a 'search' stage), the block partitioner 610 tests various potential configurations of a coding tree. Each potential configuration of a coding tree has associated 'candidate' CBs. The first stage involves testing various candidate CBs to select CBs providing relatively high compression efficiency with relatively low distortion. The testing generally involves a Lagrangian optimisation whereby a candidate CB is evaluated based on a weighted combination of rate (i.e., coding cost) and distortion (i.e., error with respect to the input frame data 119). 'Best' candidate CBs (i.e., the CBs with the lowest evaluated rate/distortion) are selected for subsequent encoding into the bitstream 121. Included in evaluation of candidate CBs is an option to use a CB for a given area or to further split the area according to various splitting options and code each of the smaller resulting areas with further CBs, or split the areas even further. As a consequence, both the coding tree and the CBs themselves are selected in the search stage.

The video encoder 120 produces a prediction block (PB), indicated by an arrow 620, for each CB, for example, CB 612. The PB 620 is a prediction of the contents of the associated CB 612. A subtracter module 622 produces a difference, indicated as 624 (or 'residual', referring to the difference being in the spatial domain), between the PB 620 and the CB 612. The difference 624 is a block-size difference between corresponding samples in the PB 620 and the CB 612. The difference 624 is transformed, quantised and represented as a transform block (TB), indicated by an arrow 636. The PB 620 and associated TB 636 are typically chosen from one of many possible candidate CBs, for example, based on evaluated cost or distortion.

A candidate coding block (CB) is a CB resulting from one of the prediction modes available to the video encoder 120 for the associated PB and the resulting residual. When combined with the predicted PB in the video encoder 120, the TB 636 reduces the difference between a decoded CB and the original CB 612 at the expense of additional signalling in a bitstream.

Each candidate coding block (CB), that is prediction block (PB) in combination with a transform block (TB), thus has an associated coding cost (or 'rate') and an associated difference (or 'distortion'). The distortion of the CB is typically estimated as a difference in sample values, such as a sum of absolute differences (SAD), a sum of squared differences (SSD) or a Hadamard transform applied to the differences. The estimate resulting from each candidate PB may be determined by a mode selector 686 using the difference 624 to determine a prediction mode 687. The prediction mode 687 indicates the decision to use a particular prediction mode for the current CB, for example, intra-frame prediction or inter-frame prediction. Estimation of the coding costs associated with each candidate prediction mode and corresponding residual coding may be performed at significantly lower cost than entropy coding of the residual. Accordingly, a number of candidate modes may be evaluated to determine an optimum mode in a rate-distortion sense even in a real-time video encoder.

Determining an optimum mode in terms of rate-distortion is typically achieved using a variation of Lagrangian optimisation.

Lagrangian or similar optimisation processing can be employed to both select an optimal partitioning of a CTU into CBs (by the block partitioner 610) as well as the selection of a best prediction mode from a plurality of possibilities. Through application of a Lagrangian optimisation process of the candidate modes in the mode selector module 686, the intra prediction mode with the lowest cost measurement is selected as the 'best' mode. The lowest cost mode includes the selected secondary transform index 688, which is also encoded in the bitstream 121 by an entropy encoder 638.

In the second stage of operation of the video encoder 120 (referred to as a 'coding' stage), an iteration over the determined coding tree(s) of each CTU is performed in the video encoder 120. For a CTU using separate trees, for each 64×64 luma region of the CTU, a luma coding tree is firstly encoded followed by a chroma coding tree. Within the luma coding tree, only luma CBs are encoded and within the chroma coding tree only chroma CBs are encoded. For a CTU using a shared tree, a single tree describes the CUS (i.e., the luma CBs and the chroma CBs) according to the common block structure of the shared tree.

The entropy encoder 638 supports bitwise coding of syntax elements using variable-length and fixed-length codewords, and an arithmetic coding mode for syntax elements. Portions of the bitstream such as 'parameter sets', for example, sequence parameter set (SPS) and picture parameter set (PPS) use a combination of fixed-length codewords and variable-length codewords. Slices, also referred to as contiguous portions, have a slice header that uses variable length coding followed by slice data, which uses arithmetic coding. The slice header defines parameters specific to the current slice, such as slice-level quantisation parameter offsets. The slice data includes the syntax elements of each CTU in the slice. Use of variable length coding and arithmetic coding requires sequential parsing within each portion of the bitstream. The portions may be delineated with a start code to form 'network abstraction layer units' or 'NAL units'. Arithmetic coding is supported using a context-adaptive binary arithmetic coding process.

Arithmetically coded syntax elements consist of sequences of one or more 'bins'.

Bins, like bits, have a value of '0' or '1'. However, bins are not encoded in the bitstream 121 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits in the bitstream 121, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (i.e., a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context may be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the entropy encoder 638 are bins that lack a context, referred to as "bypass bins". Bypass bins are coded assuming an equiprobable distribution between a '0' and a '1'. Thus, each bin has a coding cost of one bit in the bitstream 121. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 638 encodes a quantisation parameter 692 and, if in use for the current CB, the LFNST index 388, using a combination of context-coded and bypass-coded bins. The quantisation parameter 692 is encoded using a 'delta QP'. The delta QP is signalled at most once in each area known as a 'quantisation group'. The quantisation parameter 692 is applied to residual coefficients of the luma CB. An adjusted quantisation parameter is applied to the residual coefficients of collocated chroma CBs. The adjusted quantisation parameter may include mapping from the luma quantisation parameter 692 according to a mapping table and a CU-level offset, selected from a list of offsets. The secondary transform index 688 is signalled when the residual associated with the transform block includes significant residual coefficients only in those coefficient positions subject to transforming into primary coefficients by application of a secondary transform.

A multiplexer module 684 outputs the PB 620 from an intra-frame prediction module 664 according to the determined best intra prediction mode, selected from the tested prediction mode of each candidate CB. The candidate prediction modes need not include every conceivable prediction mode supported by the video encoder 120. Intra prediction falls into three types, first, "DC intra prediction", which involves populating a PB with a single value representing the average of nearby reconstructed samples; second, "planar intra prediction", which involves populating a PB with samples according to a plane, with a DC offset and a vertical and horizontal gradient being derived from nearby reconstructed neighbouring samples. The nearby reconstructed samples typically include a row of reconstructed samples above the current PB, extending to the right of the PB to an extent and a column of reconstructed samples to the left of the current PB, extending downwards beyond the PB to an extent; and, third, "angular intra prediction", which involves populating a PB with reconstructed neighbouring samples filtered and propagated across the PB in a particular direction (or 'angle'). In VVC, sixty-five (65) angles are supported, with rectangular blocks able to utilise additional angles, not available to square blocks, to produce a total of eighty-seven (87) angles.

A fourth type of intra prediction is available to chroma PBs, whereby the PB is generated from collocated luma reconstructed samples according to a 'cross-component linear model' (CCLM) mode. Three different CCLM modes are available, each mode using a different model derived from the neighbouring luma and chroma samples. The derived model is used to generate a block of samples for the chroma PB from the collocated luma samples. Luma blocks may be intra predicted using a matrix multiplication of the reference samples using one matrix selected from a predefined set of matrices. This matrix intra prediction (MIP) achieves gain by using matrices trained on a large set of video data, with the matrices representing relationships between reference samples and a predicted block that are not easily captured in angular, planar, or DC intra prediction modes.

The module 664 may also produce a prediction unit by copying a block from nearby the current frame using an 'intra block copy' (IBC) method. The location of the reference block is constrained to an area equivalent to one CTU, divided into 64×64 regions known as VPDUs, with the area covering the processed VPDUs of the current CTU and VPDUs of the previous CTU up to the area limit of one CTU. This area is known as an 'IBC virtual buffer' and limits the IBC reference area, thus limiting the required storage. The IBC buffer is populated with reconstructed samples 654 (i.e. prior to loop filtering), and so a separate buffer to the frame buffer 672 is needed.

The residual for a predicted block when encoding feature map data is different to the residual seen for natural video. Such natural video is typically captured by an imaging sensor, or screen content, as generally seen in operating system user interfaces and the like. Feature map residuals tend to contain much detail, which is amenable to transform skip coding more than predominantly low-frequency coefficients of various transforms. Experiments show that the feature map residual has enough local similarity to benefit from transform coding. However, the distribution of feature map residual coefficients is not clustered towards the DC (top-left) coefficient of a transform block. In other words, sufficient correlation exists for a transform to show gain when encoding feature map data and this is true also for when intra block copy is used to produce prediction blocks for the feature map data. Accordingly, a Hadamard cost estimate may be used when evaluating residuals resulting from candidate block vectors for intra block copy when encoding feature map data, instead of relying solely on a SAD or SSD cost estimate. SAD or SSD cost estimates tend to select block vectors with residuals more amenable to transform skip coding and may miss block vectors with residuals that would be compactly encoded using transforms. The multiple transform selection (MTS) tool of the VVC standard may be used when encoding feature map data so that, in addition to the DCT-2 transform, combinations of DST-7 and DCT-8 transforms are available horizontally and vertically for residual encoding.

An intra-predicted luma coding block may be partitioned into a set of equal-sized prediction blocks, either vertically or horizontally, which each block having a minimum area of sixteen (16) luma samples. This intra sub-partition (ISP) approach enables separate transform blocks to contribute to prediction block generation from one sub-partition to the next sub-partition in the luma coding block, improving compression efficiency.

Where previously reconstructed neighbouring samples are unavailable, for example at the edge of the frame, a default half-tone value of one half the range of the samples is used. For example, for 10-bit video a value of five-hundred and twelve (512) is used. As no previously samples are available for a CB located at the top-left position of a frame, angular and planar intra-prediction modes produce the same output as the DC prediction mode (i.e. a flat plane of samples having the half-tone value as magnitude).

For inter-frame prediction a prediction block 682 is produced using samples from one or two frames preceding the current frame in the coding order frames in the bitstream by a motion compensation module 680 and output as the PB 620 by the multiplexer module 684. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted.

Frames are typically coded using a 'group of pictures' structure, enabling a temporal hierarchy of frames. Frames may be divided into multiple slices, each of which encodes a portion of the frame. A temporal hierarchy of frames allows a frame to reference a preceding and a subsequent picture in the order of displaying the frames. The images are coded in the order necessary to ensure the dependencies for decoding each frame are met. An affine inter prediction mode is available where instead of using one or two motion vectors to select and filter reference sample blocks for a prediction unit, the prediction unit is divided into multiple smaller blocks and a motion field is produced so each smaller block has a distinct motion vector. The motion field uses the motion vectors of nearby points to the prediction unit as 'control points'. Affine prediction allows coding of motion different to translation with less need to use deeply split coding trees. A bi-prediction mode available to VVC performs a geometric blend of the two reference blocks along a selected axis, with angle and offset from the centre of the block signalled. This geometric partitioning mode ("GPM") allows larger coding units to be used along the boundary between two objects, with the geometry of the boundary coded for the coding unit as an angle and centre offset. Motion vector differences, instead of using cartesian (x, y) offset, may be coded as a direction (up/down/left/right) and a distance, with a set of power-of-two distances supported. The motion vector predictor is obtained from a neighbouring block ('merge mode') as if no offset is applied. The current block will share the same motion vector as the selected neighbouring block.

The samples are selected according to a motion vector 678 and reference picture index. The motion vector 678 and reference picture index applies to all colour channels and thus inter prediction is described primarily in terms of operation upon PUs rather than PBs. The decomposition of each CTU into one or more inter-predicted blocks is described with a single coding tree. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected the PB 620, and subtracted the PB 620 from the original sample block at the subtractor 622, a residual with lowest coding cost, represented as 624, is obtained and subjected to lossy compression. The lossy compression process comprises the steps of transformation, quantisation and entropy coding. A forward primary transform module 626 applies a forward transform to the difference 624, converting the difference 624 from the spatial domain to the frequency domain, and producing primary transform coefficients represented by an arrow 628. The largest primary transform size in one dimension is either a 32-point DCT-2 or a 64-point DCT-2 transform, configured by a 'sps_max_luma_transform_size_64_flag' in the sequence parameter set. If the CB being encoded is larger than the largest supported primary transform size expressed as a block size (e.g. 64×64 or 32×32), the primary transform 626 is applied in a tiled manner to transform all samples of the difference 624. Where a non-square CB is used, tiling is also performed using the largest available transform size in each dimension of the CB. For example, when a maximum transform size of thirty-two (32) is used, a 64×16 CB uses two 32×16 primary transforms arranged in a tiled manner. When a CB is larger in size than the maximum supported transform size, the CB is filled with TBs in a tiled manner. For example, a 128×128 CB with 64-pt transform maximum size is filled with four 64×64 TBs in a 2×2 arrangement. A 64×128 CB with a 32-pt transform maximum size is filled with eight 32×32 TBs in a 2×4 arrangement.

Application of the transform 626 results in multiple TBs for the CB. Where each application of the transform operates on a TB of the difference 624 larger than 32×32, e.g. 64×64, all resulting primary transform coefficients 628 outside of the upper-left 32×32 area of the TB are set to zero (i.e., discarded). The remaining primary transform coefficients 628 are passed to a quantiser module 634. The primary transform coefficients 628 are quantised according to a quantisation parameter 692 associated with the CB to produce primary transform coefficients 632. In addition to the quantisation parameter 692, the quantiser module 634 may also apply a 'scaling list' to allow non-uniform quantisation within the TB by further scaling residual coefficients according to their spatial position within the TB. The quantisation parameter 692 may differ for a luma CB versus each chroma CB. The primary transform coefficients 632 are passed to a forward secondary transform module 630 to produce transform coefficients represented by the arrow 636 by performing either a non-separable secondary transform (NSST) operation or bypassing the secondary transform. The forward primary transform is typically separable, transforming a set of rows and then a set of columns of each TB. The forward primary transform module 626 uses either a type-II discrete cosine transform (DCT-2) in the horizontal and vertical directions, or bypass of the transform horizontally and vertically, or combinations of a type-VII discrete sine transform (DST-7) and a type-VIII discrete cosine transform (DCT-8) in either horizontal or vertical directions for luma TBs not exceeding 16 samples in width and height. Use of combinations of a DST-7 and DCT-8 is referred to as 'multi transform selection set' (MTS) in the VVC standard.

The forward secondary transform of the module 630 is generally a non-separable transform, which is only applied for the residual of intra-predicted CUs and may nonetheless also be bypassed. The forward secondary transform operates either on sixteen (16) samples (arranged as the upper-left 4×4 sub-block of the primary transform coefficients 628) or forty-eight (48) samples (arranged as three 4×4 sub-blocks in the upper-left 8×8 coefficients of the primary transform coefficients 628) to produce a set of secondary transform coefficients. The set of secondary transform coefficients may be fewer in number than the set of primary transform coefficients from which they are derived. Due to application of the secondary transform to only a set of coefficients adjacent to each other and including the DC coefficient, the secondary transform is referred to as a 'low frequency non-separable secondary transform' (LFNST). Moreover, when the LFNST is applied, all remaining coefficients in the TB are zero, both in the primary transform domain and the secondary transform domain.

The quantisation parameter 692 is constant for a given TB and thus results in a uniform scaling for the production of residual coefficients in the primary transform domain for a TB. The quantisation parameter 692 may vary periodically with a signalled 'delta quantisation parameter'. The delta quantisation parameter (delta QP) is signalled once for CUs contained within a given area, referred to as a 'quantisation group'. If a CU is larger than the quantisation group size, delta QP is signalled once with one of the TBs of the CU. That is, the delta QP is signalled by the entropy encoder 638 once for the first quantisation group of the CU and not signalled for any subsequent quantisation groups of the CU. A non-uniform scaling is also possible by application of a 'quantisation matrix', whereby the scaling factor applied for each residual coefficient is derived from a combination of the quantisation parameter 692 and the corresponding entry in a scaling matrix. The scaling matrix may have a size that is smaller than the size of the TB, and when applied to the TB a nearest neighbour approach is used to provide scaling values for each residual coefficient from a scaling matrix smaller in size than the TB size. The residual coefficients 636 are supplied to the entropy encoder 638 for encoding in the bitstream 121. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. The scan within each sub-block and the progression from one sub-block to the next typically follow a backward diagonal scan pattern. Additionally, the quantisation parameter 692 is encoded into the bitstream 121 using a delta QP syntax element and the secondary transform index 688 is encoded in the bitstream 121.

As described above, the video encoder 120 needs access to a frame representation corresponding to the decoded frame representation seen in the video decoder 144. Thus, the residual coefficients 636 are passed through an inverse secondary transform module 644, operating in accordance with the secondary transform index 688 to produce intermediate inverse transform coefficients, represented by an arrow 642. The intermediate inverse transform coefficients 642 are inverse quantised by a dequantiser module 640 according to the quantisation parameter 692 to produce inverse transform coefficients, represented by an arrow 646. The dequantiser module 640 may also perform an inverse non-uniform scaling of residual coefficients using a scaling list, corresponding to the forward scaling performed in the quantiser module 634. The inverse transform coefficients 646 are passed to an inverse primary transform module 648 to produce residual samples, represented by an arrow 650, of the TU. The inverse primary transform module 648 applies DCT-2 transforms horizontally and vertically, constrained by the maximum available transform size as described with reference to the forward primary transform module 626. The types of inverse transform performed by the inverse secondary transform module 644 correspond with the types of forward transform performed by the forward secondary transform module 630. The types of inverse transform performed by the inverse primary transform module 648 correspond with the types of primary transform performed by the primary transform module 626. A summation module 652 adds the residual samples 650 and the PU 620 to produce reconstructed samples (indicated by an arrow 654) of the CU.

The reconstructed samples 654 are passed to a reference sample cache 656 and an in-loop filters module 668. The reference sample cache 656, typically implemented using static RAM on an ASIC to avoid costly off-chip memory access, provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 656 supplies reference samples (represented by an arrow 658) to a reference sample filter 660. The sample filter 660 applies a smoothing operation to produce filtered reference samples (indicated by an arrow 662). The filtered reference samples 662 are used by an intra-frame prediction module 664 to produce an intra-predicted block of samples, represented by an arrow 666. For each candidate intra prediction mode the intra-frame prediction module 664 produces a block of samples, that is 666. The block of samples 666 is generated by the module 664 using techniques such as DC, planar or angular intra prediction. The block of samples 666 may also be produced using a matrix-multiplication approach with neighbouring reference sample as input and a matrix selected from a set of matrices by the video encoder 120, with the selected matrix signalled in the bitstream 120 using an index to identify which matrix of the set of matrices is to be used by the video decoder 144.

The in-loop filters module 668 applies several filtering stages to the reconstructed samples 654. The filtering stages include a 'deblocking filter' (DBF) which applies smoothing aligned to the CU boundaries to reduce artefacts resulting from discontinuities. The deblocking filter smooths block edges where coding artefacts may be seen resulting from the transform basis functions causing misaligned boundaries along block boundaries, such artefacts are more visible at higher values of the quantisation parameter 692. At lower values of the quantisation parameter 692, the filtering strength of the deblocking filter is reduced. Another filtering stage present in the in-loop filters module 668 is an 'adaptive loop filter' (ALF), which applies a Wiener-based adaptive filter to further reduce distortion. A further available filtering stage in the in-loop filters module 668 is a 'sample adaptive offset' (SAO) filter. The SAO filter operates by firstly classifying reconstructed samples into one or multiple categories and, according to the allocated category, applying an offset at the sample level.

Filtered samples, represented by an arrow 670, are output from the in-loop filters module 668. The filtered samples 670 are stored in a frame buffer 672. The frame buffer 672 typically has the capacity to store several (e.g., up to sixteen (16)) pictures and thus is stored in the memory 206. The frame buffer 672 is not typically stored using on-chip memory due to the large memory consumption required. As such, access to the frame buffer 672 is costly in terms of memory bandwidth. The frame buffer 672 provides reference frames (represented by an arrow 674) to a motion estimation module 676 and the motion compensation module 680.

The motion estimation module 676 estimates a number of 'motion vectors' (indicated as 678), each being a Cartesian spatial offset from the location of the present CB, referencing a block in one of the reference frames in the frame buffer 672. A filtered block of reference samples (represented as 682) is produced for each motion vector. The filtered reference samples 682 form further candidate modes available for potential selection by the mode selector 686. Moreover, for a given CU, the PU 620 may be formed using one reference block ('uni-predicted') or may be formed using two reference blocks ('bi-predicted'). For the selected motion vector, the motion compensation module 680 produces the PB 620 in accordance with a filtering process supportive of sub-pixel accuracy in the motion vectors. As such, the motion estimation module 676 (which operates on many candidate motion vectors) may perform a simplified filtering process compared to that of the motion compensation module 680 (which operates on the selected candidate only) to achieve reduced computational complexity. When the video encoder 120 selects inter prediction for a CU the motion vector 678 is encoded into the bitstream 121.

Although the video encoder 120 of FIG. 6 is described with reference to versatile video coding (VVC), other video coding standards or implementations may also employ the processing stages of modules 610-690. The frame data 119 (and bitstream 121) may also be read from (or written to) memory 206, the hard disk drive 210, a CD-ROM, a Blu-ray Disk™ or other computer readable storage medium. Additionally, the frame data 119 (and bitstream 121) may be received from (or transmitted to) an external source, such as a server connected to the communications network 220 or a radio-frequency receiver. The communications network 220 may provide limited bandwidth, necessitating the use of rate control in the video encoder 120 to avoid saturating the network at times when the frame data 119 is difficult to compress. Moreover, the bitstream 121 may be constructed from one or more slices, representing spatial sections (collections of CTUs) of the frame data 119, produced by one or more instances of the video encoder 120, operating in a co-ordinated manner under control of the processor 205.

The video decoder 144 is shown in FIG. 7. Although the video decoder 144 of FIG. 7 is an example of a versatile video coding (VVC) video decoding pipeline, other video codecs may also be used to perform the processing stages described herein. As shown in FIG. 7, the bitstream 143 is input to the video decoder 144. The bitstream 143 may be read from memory 206, the hard disk drive 210, a CD-ROM, a Blu-ray Disk™ or other non-transitory computer readable storage medium. Alternatively, the bitstream 143 may be received from an external source such as a server connected to the communications network 220 or a radio-frequency receiver. The bitstream 143 contains encoded syntax elements representing the captured frame data to be decoded.

The bitstream 143 is input to an entropy decoder module 720. The entropy decoder module 720 extracts syntax elements from the bitstream 143 by decoding sequences of 'bins' and passes the values of the syntax elements to other modules in the video decoder 144. The entropy decoder module 720 uses variable-length and fixed length decoding to decode SPS, PPS or slice header an arithmetic decoding engine to decode syntax elements of the slice data as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop, thus each slice may be decoded in the slice's entirety by a given entropy decoder 720 instance. A single (or few) high-performing entropy decoder 720 instances may decode all slices for a frame from the bitstream 143 multiple lower-performing entropy decoder 720 instances may concurrently decode the slices for a frame from the bitstream 143.

The entropy decoder module 720 applies an arithmetic coding algorithm, for example 'context adaptive binary arithmetic coding' (CABAC), to decode syntax elements from the bitstream 143. The decoded syntax elements are used to reconstruct parameters within the video decoder 144. Parameters include residual coefficients (represented by an arrow 724), a quantisation parameter 774, a secondary transform index 770, and mode selection information such as an intra prediction mode (represented by an arrow 758). The mode selection information also includes information such as motion vectors, and the partitioning of each CTU into one or more CBs. Parameters are used to generate PBs, typically in combination with sample data from previously decoded CBs.

The residual coefficients 724 are passed to an inverse secondary transform module 736 where either a secondary transform is applied or no operation is performed (bypass) according to a secondary transform index. The inverse secondary transform module 736 produces reconstructed transform coefficients 732, that is primary transform domain coefficients, from secondary transform domain coefficients. The reconstructed transform coefficients 732 are input to a dequantiser module 728. The dequantiser module 728 performs inverse quantisation (or 'scaling') on the residual coefficients 732, that is, in the primary transform coefficient domain, to create reconstructed intermediate transform coefficients, represented by an arrow 740, according to the quantisation parameter 774. The dequantiser module 728 may also apply a scaling matrix to provide non-uniform dequantization within the TB, corresponding to operation of the dequantiser module 640. Should use of a non-uniform inverse quantisation matrix be indicated in the bitstream 143, the video decoder 144 reads a quantisation matrix from the bitstream 143 as a sequence of scaling factors and arranges the scaling factors into a matrix. The inverse scaling uses the quantisation matrix in combination with the quantisation parameter to create the reconstructed intermediate transform coefficients 740.

The reconstructed transform coefficients 740 are passed to an inverse primary transform module 744. The module 744 transforms the coefficients 740 from the frequency domain back to the spatial domain. The inverse primary transform module 744 applies inverse DCT-2 transforms horizontally and vertically, constrained by the maximum available transform size as described with reference to the forward primary transform module 626. The result of operation of the module 744 is a block of residual samples, represented by an arrow 748. The block of residual samples 748 is equal in size to the corresponding CB. The residual samples 748 are supplied to a summation module 750.

At the summation module 750 the residual samples 748 are added to a decoded PB (represented as 752) to produce a block of reconstructed samples, represented by an arrow 756. The reconstructed samples 756 are supplied to a reconstructed sample cache 760 and an in-loop filtering module 788. The in-loop filtering module 788 produces reconstructed blocks of frame samples, represented as 792. The frame samples 792 are written to a frame buffer 796.

The reconstructed sample cache 760 operates similarly to the reconstructed sample cache 656 of the video encoder 120. The reconstructed sample cache 760 provides storage for reconstructed samples needed to intra predict subsequent CBs without the memory 206 (e.g., by using the data 232 instead, which is typically on-chip memory). Reference samples, represented by an arrow 764, are obtained from the reconstructed sample cache 760 and supplied to a reference sample filter 768 to produce filtered reference samples indicated by arrow 772. The filtered reference samples 772 are supplied to an intra-frame prediction module 776. The module 776 produces a block of intra-predicted samples, represented by an arrow 780, in accordance with the intra prediction mode parameter 758 signalled in the bitstream 143 and decoded by the entropy decoder 720. The intra prediction module 776 supports the modes of the module 664, including IBC and MIP. The block of samples 780 is generated using modes such as DC, planar or angular intra prediction.

When the prediction mode of a CB is indicated to use intra prediction in the bitstream 143, the intra-predicted samples 780 form the decoded PB 752 via a multiplexor module 784. Intra prediction produces a prediction block (PB) of samples, which is a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma CBs share the same intra prediction mode.

When the prediction mode of the CB is indicated to be inter prediction in the bitstream 143, a motion compensation module 734 produces a block of inter-predicted samples, represented as 738. The block of inter-predicted samples 738 are produced using a motion vector, decoded from the bitstream 143 by the entropy decoder 720, and reference frame index to select and filter a block of samples 798 from a frame buffer 796. The block of samples 798 is obtained from a previously decoded frame stored in the frame buffer 796. For bi-prediction, two blocks of samples are produced and blended together to produce samples for the decoded PB 752. The frame buffer 796 is populated with filtered block data 792 from an in-loop filtering module 788. As with the in-loop filtering module 668 of the video encoder 120, the in-loop filtering module 788 applies any of the DBF, the ALF and SAO filtering operations. Generally, the motion vector is applied to both the luma and chroma channels, although the filtering processes for sub-sample interpolation in the luma and chroma channel are different.

Not shown in FIGS. 6 and 7 is a module for preprocessing video prior to encoding and postprocessing video after decoding to shift sample values such that a more uniform usage of the range of sample values within each chroma channel is achieved. A multi-segment linear model is derived in the video encoder 120 and signalled in the bitstream for use by the video decoder 144 to undo the sample shifting. This linear-model chroma scaling (LMCS) tool provides compression benefit for particular colour spaces and content that have some nonuniformity, especially utilisation of a limited range, in their utilisation of the sample space that may result in higher quality loss from application of quantisation.

Figure 8:
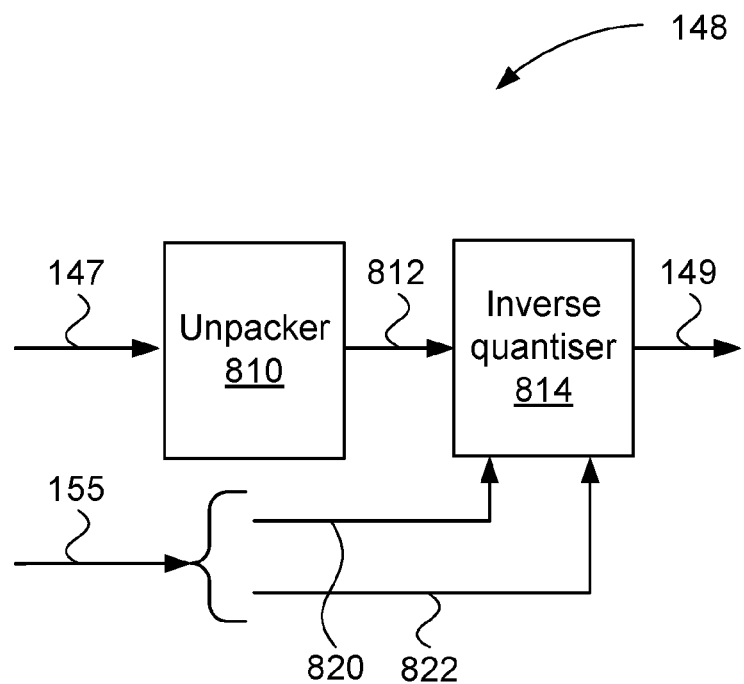
FIG. 8 is a schematic block diagram showing a feature map inverse quantiser and unpacker as part of a distributed machine task system.

FIG. 8 is a schematic block diagram showing a feature map inverse quantiser and unpacker 148 as part of a distributed machine task system 100. Decoded frames 147 are input to an unpacker module 810, where feature maps are extracted from each frame according to a packing format to produce unpacked feature maps 812. The unpacked feature maps 812 include sample values as present in the decoded frame 147. Packing formats are described further with reference to FIGS. 11-13. The sets of feature maps in the unpacked feature maps 812 are assigned to groups according to feature map groups 820, obtained from the decoded metadata 155, such that each feature map belongs to one group and one or more groups are indicated in the feature map groups 820. An inverse quantiser 814 then performs a scaling to convert the integer sample values present in the unpacked feature maps 812 to floating point values present in tensors 149. The scaling uses a quantisation range for a group of feature maps. The quantisation range is obtained from the quantisation ranges 822 which are extracted from the decoded metadata 155. A quantisation range specifies the maximum magnitude of any floating point value seen in the feature maps belonging to a corresponding group. The inverse quantiser 814 normalises samples from the feature maps 812 in each group into a range centred on zero and either reaching 1 or −1, depending on the sign of the maximum magnitude value found being positive or negative. In rare cases where positive and negative values have an equal maximum magnitude, a range of [−1, 1] is observed. The normalised samples of a group of feature maps are then multiplied (scaled) by the quantisation range for the group of feature maps.

Once all groups of feature maps are scaled, the result is output as intermediate data in the form of tensors 149. The tensors 149 may contain multiple tensors each having a different spatial resolution, for example when the CNN backbone 114 includes an FPN. In addition to using a zero-centred linear, symmetric, quantisation process, other quantisation processes are also possible. For example, an asymmetric approach where a positive and a negative quantisation range are signalled for each feature map group, may be used. The positive and negative quantisation range map the range utilised by floating point values of the group of feature maps into the full sample range afforded by the bit depth of the samples, which results in an asymmetric quantisation as the mid-point of the sample range that is no longer guaranteed to correspond to a zero floating point value. A 'quant_type' syntax element in the SEI message 1413 selects the quantisation approach and is described with reference to Appendix A.

Although a quantisation range for a given group of feature maps is derived from the values within the feature maps of the group, the quantisation range needs to retain the same data type as the values within the feature maps of the group. A coarser floating point precision may be used, with rounding applied so that the range, when expressed back in the original floating point format (e.g. 32-bit IEEE 754 format) is not reduced. For example, the coarser floating point precision may be used with upward rounding in the step 1550. The upward rounding may be achieved by adding a constant value epsilon ($\epsilon$) to the quantisation range qr to produce an adjusted quantisation range $qr_{adjust}$, such that $\epsilon=2^{floor(log\ 2(qr)}/2^{fract\_prec}$, where frac_prec is the number of fractional bits to preserve, the 'floor' operator rounds towards the next more negative integer. Then, fract_prec leftmost bits of the fractional portion of $qr_{adjust}$ may be taken and coded into the SEI message, with the remaining bits truncated and $qr_{adjust}$ will never be a smaller value than qr. The precision of quantisation range in terms of bits allocated to the fraction portion is selected using a 'qr_fraction_precision' syntax element which is described with reference to Appendix A. Setting qr_fraction_precision (fract_prec) to 5 (five) allowed setting the quantisation range accurately, with ~3% worst case increase compared to the fraction precision of the original floating-point value, i.e., prior to reducing the fractional precision to five bits. To produce a mantissa for a quantisation range, a leading '1' is prepended to the fraction portion (i.e., the quantisation range may not be a 'denormal' value). As a quantisation range is always positive, there is no need to encode a sign bit for each quantisation range. The quantisation range may be greater than one or less than one, so a sign bit for the quantisation range exponent is needed. In an arrangement of the system 100, quantisation ranges below 1.0 are not permitted and the quantisation exponent sign bit may be omitted from the SEI message 1413. When the quantisation exponent sign bit is not coded, quantisation ranges less than 1.0 are clipped to the value 1.0 in the quantisation range determiner module 514.

Notwithstanding that the operation of the inverse quantiser module 814 and the quantiser module 518 is referred to as 'quantisation', operation of the modules 518 and 814 is distinct from quantisation operation of the video encoder 120 and the video decoder 144, which involves the use of the quantisation parameter. Moreover, operation of the modules 518 and 814 may be viewed as a form of tone mapping operation, involving the conversion between floating point domain of tensors and sample domain of frames. Although there is a scaling (i.e., via the quantisation range of each group of feature maps) for the purpose of utilising a wide range of the sample value space, there is no quantisation parameter applicable to the modules 518 and 814 to further alter the quantiser step size.

Figure 9A:
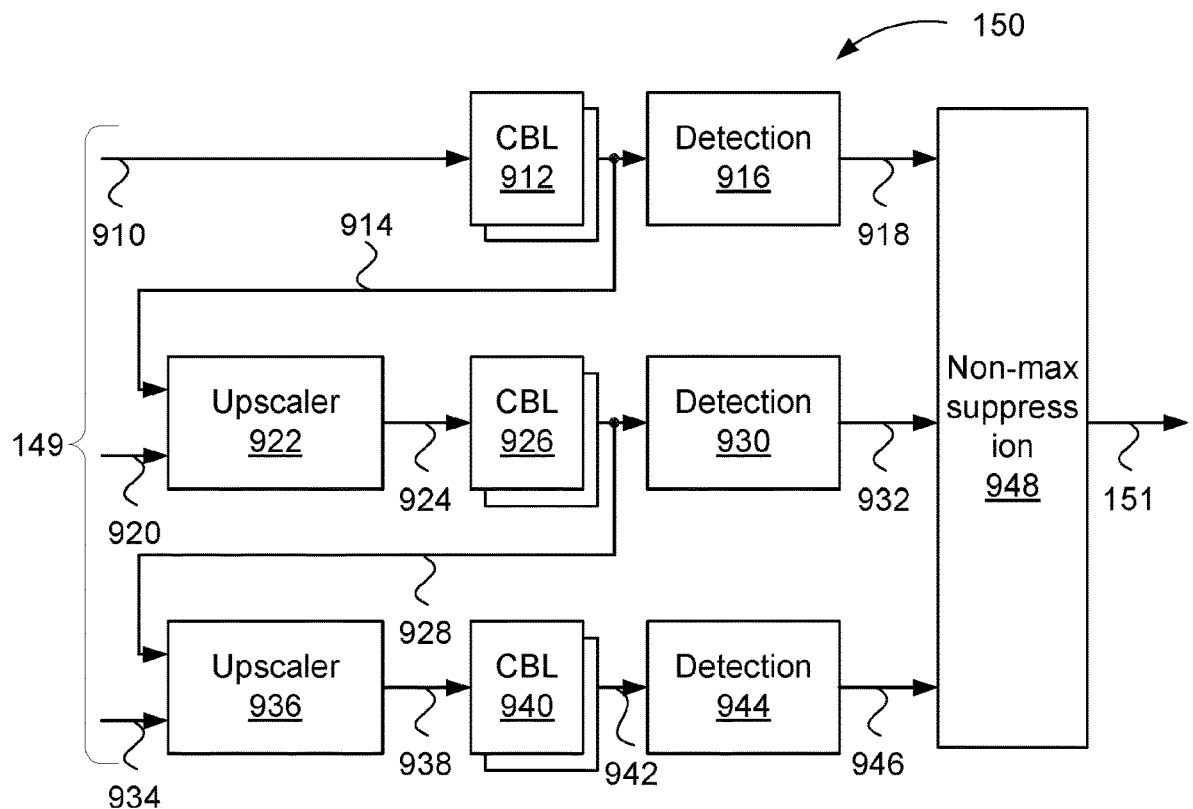
FIG. 9A is a schematic block diagrams showing a head portion of a CNN.
Figure 9B:
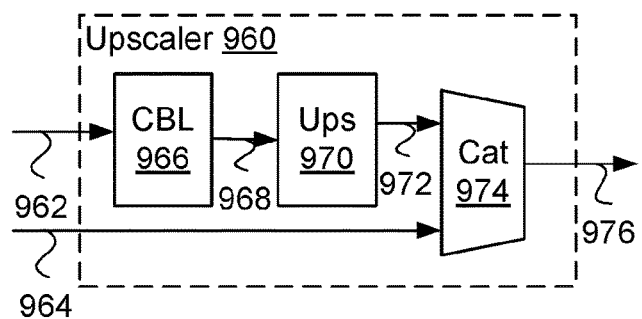
FIG. 9B is a schematic block diagram showing an upscaler module of FIG. 9A.

FIG. 9A is a schematic block diagrams showing a head portion 150 of a CNN for object detection. Depending on the task to be performed in the destination device 140, different networks may be substituted for the CNN head 150. Incoming tensors 149 are separated into the tensor of each layer (i.e., tensors 910, 920, and 934). The tensor 910 is passed to a CBL module 912 to produce tensor 914, which is passed to a detection module 916 and an upscaler module 922. Bounding boxes 918, in the form of a detection tensor, are passed to a non-maximum suppression (NMS) module 948 to produce a detection result 151. To produce bounding boxes addressing co-ordinates in the original video data 113, prior to resizing for the backbone portion of the network 114, scaling by the original video width and height is performed (see 'orig_source_width' and 'orig_source_height', decoded from the SEI message 1413 and described with reference to Appendix A). The upscaler module 922 produces an upscaled tensor 924, which is passed to a CBL module 926, which produces tensor 928 as output. The tensor 928 is passed to a detection module 930 and an upscaler module 936. The detection module 930 produces a detection tensor 932, which is supplied to the NMS module 948. The upscaler module 936 is another instance of the module 960 and outputs an upscaled tensor 938. The upscaled tensor 938 is passed to a CBL module 940, which outputs a tensor 942 to a detection module 944. The CBL modules 912, 926, and 940 each contain a concatenation of five CBL modules. The upscaler modules 922 and 936 are each instances of an upscaler module 960 as shown in FIG. 9B.

Figure 9C:
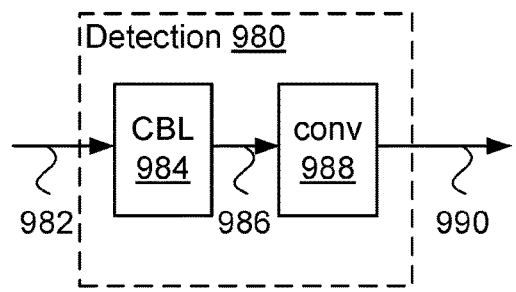
FIG. 9C is a schematic block diagram showing a detection module of FIG. 9A.

The upscaler module 960 accepts a tensor 962 as input, which is passed to a CBL module 966 to produce a tensor 968. The tensor 968 is passed to an upsampler 970 to produce an upsampled tensor 972. A concatenation module 974 produces a tensor 976 by concatenating the upsampled tensor 972 with an input tensor 964. The detection modules 916, 930, and 944 are instances of a detection module 980 as shown in FIG. 9C. The detection module 960 receives a tensor 982, which is passed to a CBL module 984 to produce a tensor 986. The tensor 986 is passed to a convolution module 988, which implements a detection kernel. A detection kernel a 1×1 kernel applied to produce the output on feature maps at the three layers. The detection kernel is 1×1×(B×(5+C)), where B is the number of bounding boxes a particular cell can predict, typically three (3), and C is the number of classes, which may be eighty (80), resulting in a kernel size of two-hundred and fifty five (255) detection attributes (i.e. tensor 990). The constant "5" represents four boundary box attributes (box centre x, y and size scale x, y) and one object confidence level ("objectness"). The result of a detection kernel has the same spatial dimensions as the input feature map, but the depth of the output corresponds to the detection attributes. The detection kernel is applied at each layer, typically three layers, resulting in a large number of candidate bounding boxes. A process of non-maximum suppression is applied by the NMS module 948 to the resulting bounding boxes to discard redundant boxes, such as overlapping predictions at similar scale, resulting in a final set of bounding boxes as output for object detection.

Figure 10:
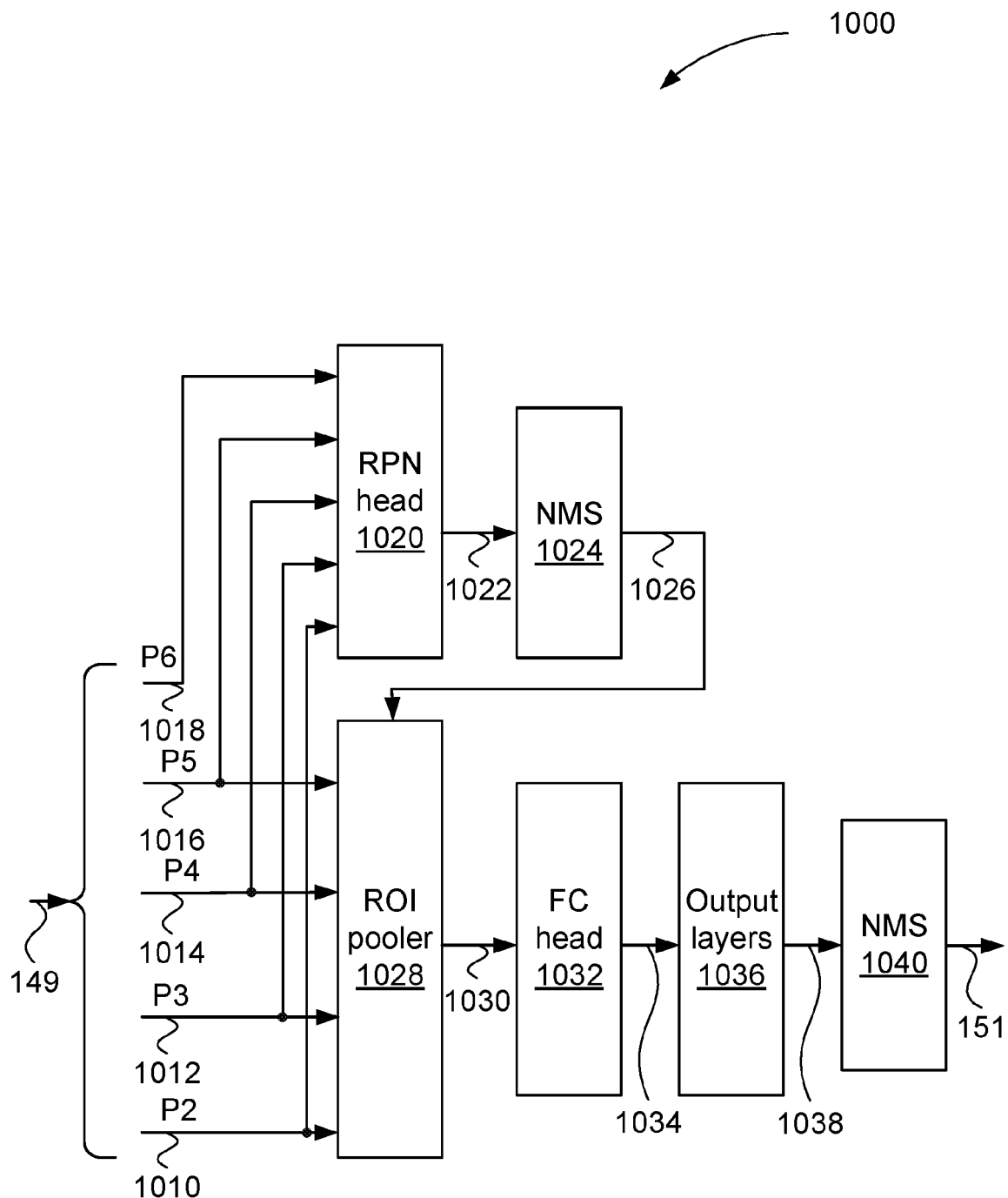
FIG. 10 is a schematic block diagram showing an alternative head portion of a CNN.

FIG. 10 is a schematic block diagram showing an alternative head portion 1000 of a CNN. The head portion 1000 forms part of an overall network known as 'faster RCNN' and includes a feature network (i.e., backbone portion 400), a region proposal network, and a detection network. Input to the head portion 1000 are the tensors 149, which include the P2-P6 layer tensors 1010, 1012, 1014, 1016, and 1018. The P2-P6 tensors 1010, 1012, 1014, 1016, and 1018 are input to a region proposal network (RPN) head module 1020. The RPN head module 1020 performs a convolution on the input tensors, producing an intermediate tensor which is fed into two subsequent sibling layers, one for classifications and one for bounding box, or 'region of interest' (ROI), regression, as classification and bounding boxes 1022. The classification and bounding boxes 1022 are passed to an NMS module 1024 which prunes out redundant bounding boxes by removing overlapping boxes with a lower score to produce pruned bounding boxes 1026. The bounding boxes 1026 are passed to a region of interest (ROI) pooler 1028. The ROI pooler 1028 produces fixed-size feature maps from various input size maps using max pooling operations, where a subsampling takes the maximum value in each group of input values to produce one output value in the output tensor.

Input to the ROI pooler 1028 are the P2-P5 feature maps 1010, 1012, 1014, and 1016, and region of interest proposals 1026. Each proposal (ROI) from 1026 is associated with a portion of the feature maps (1010-1016) to produce a fixed-size map. The fixed-size map is of a size independent of the underlying portion of the feature map 1010-1016. One of the feature maps 1010-1016 is selected such that the resulting cropped map has sufficient detail, for example, according to the following rule: floor(4+log 2(sqrt (box_area)/224)), where 224 is the canonical box size. The ROI pooler 1028 thus crops incoming feature maps according to the proposals 1026 producing a tensor 1030. The tensor 1030 is fed into a fully connected (FC) neural network head 1032. The FC head 1032 performs two fully connected layers to produce class score and bounding box predictor delta tensor 1034. The class score is generally an 80 element tensor, each element corresponding to a prediction score for the corresponding object category. The bounding box prediction deltas tensor is a 80×4=320 element tensor, containing bounding boxes for the corresponding object categories. Final processing is performed by an output layers module 1036, receiving the tensor 1034 and performing a filtering operation to produce a filtered tensor 1038. Low-scoring (low classification) objects are removed from further consideration. A non-maximum suppression module 1040 removes overlapping bounding boxes by removing the overlapped box with a lower classification score, resulting in an inference output tensor 151.

Figure 11:
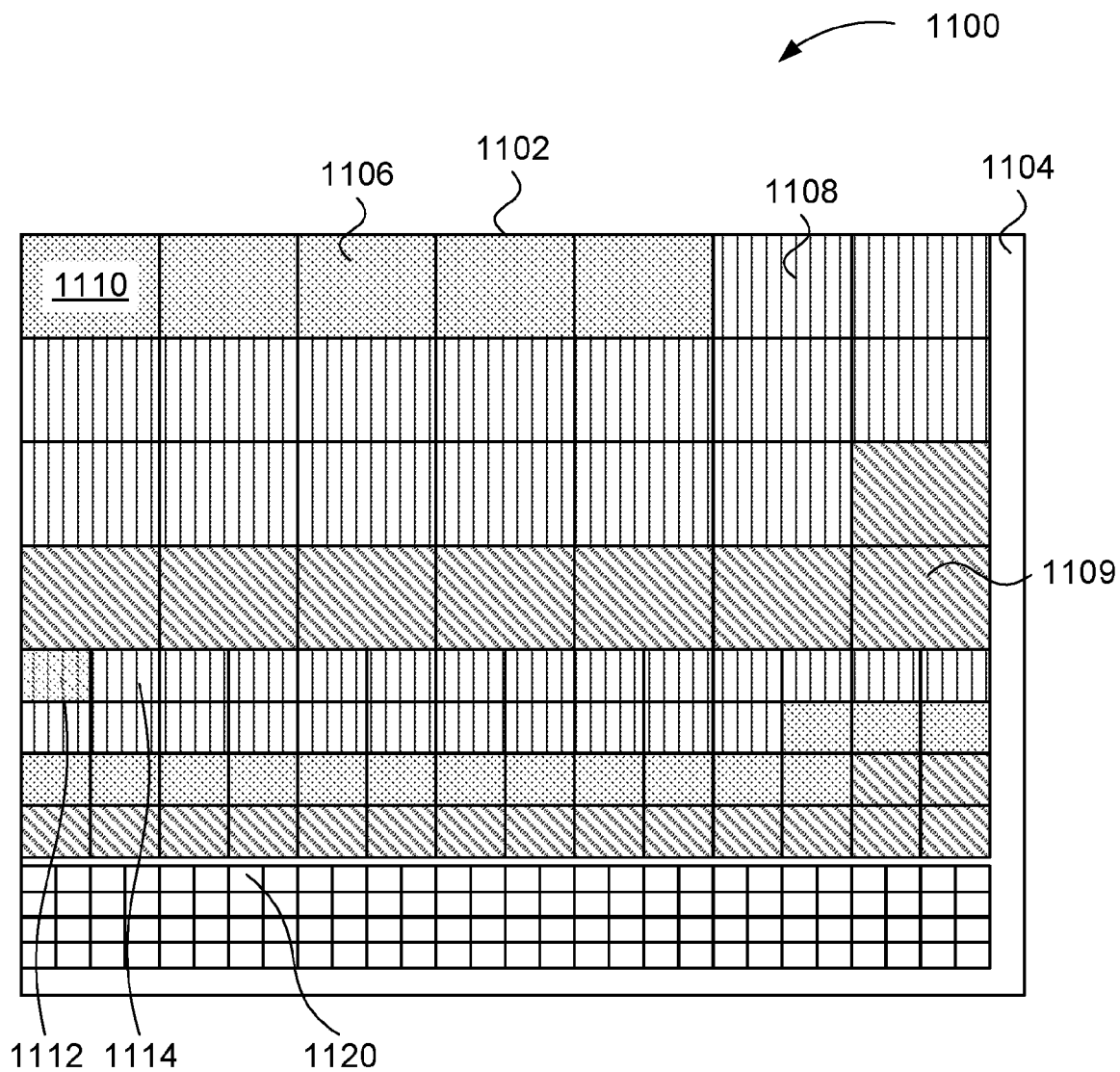
FIG. 11 is a schematic block diagram showing a feature map packing arrangement in a monochrome frame.
Figure 12:
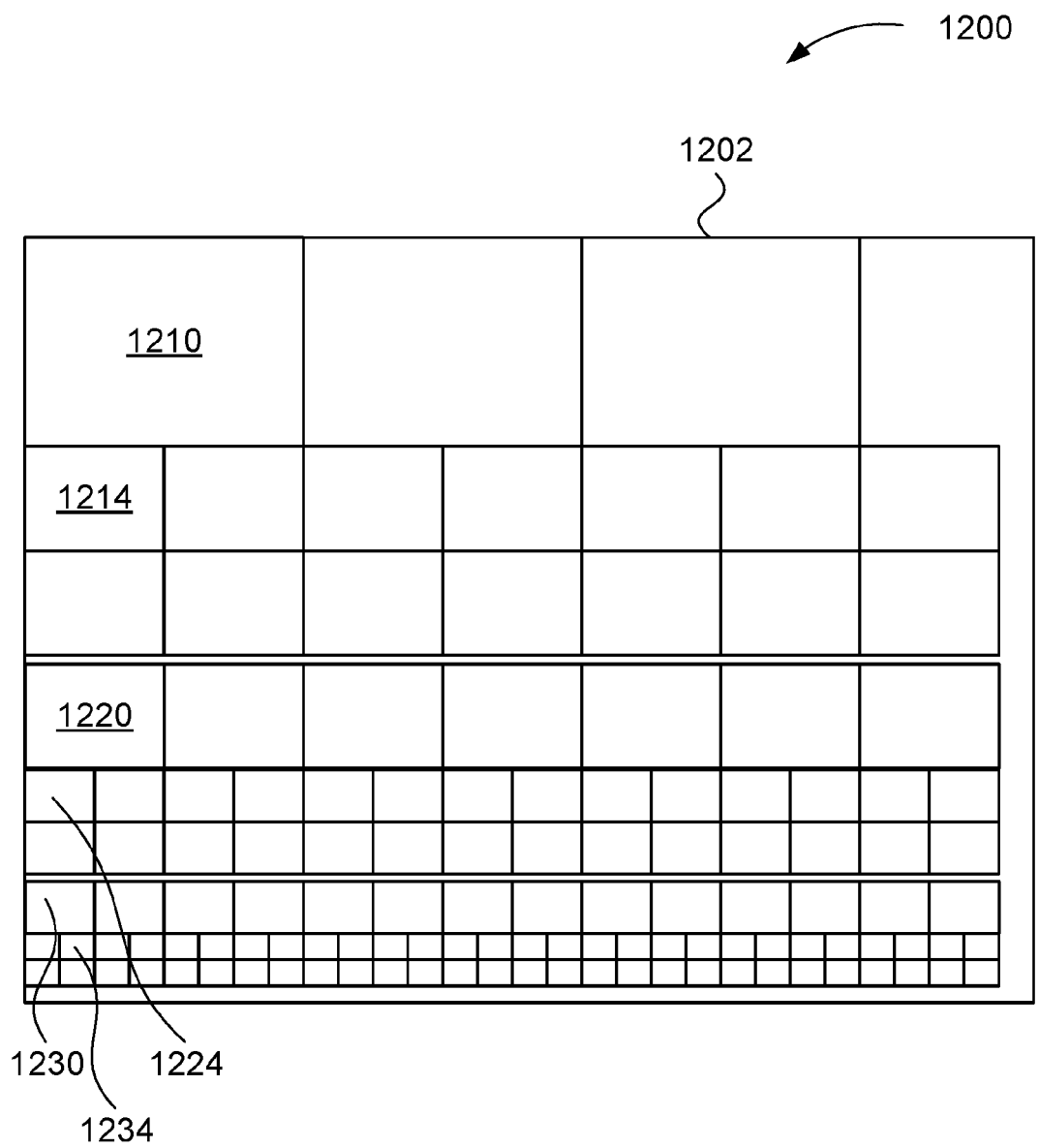
FIG. 12 is a schematic block diagram showing an alternative feature map packing arrangement in a monochrome frame.

FIG. 11 is a schematic block diagram showing a feature map packing arrangement 1100 in a two-dimensional array in the form of monochrome frame 1102. The feature maps of three layers, such as feature map 1110, feature map 1112, and feature map 1114, are arrangeable in the frame 1102. In the example of FIG. 11, the frame 1102 includes areas each of which corresponds to a feature map (e.g., feature map 1110). The feature maps 1110, 1112 and 1114 are placed in a raster-scan arrangement filling the monochrome frame 1102. The frame 1102 size is initially set according to the area of all the feature maps to be placed in the frame 1102, with an aspect ratio approximately that of a UHD frame targeted, i.e. 3840/2160~=1.78. The resolution may be increased in width and height to become a multiple of the minimum block size, for example, such that the width and height are each a multiple of four. In placing the feature maps, due to misalignment of the feature map size and the frame width, the final frame height may be increased to provide adequate space, allowing for some unused space resulting from inability to pack feature maps together without any unused space. Sample values in unused space in the frame 1102, such as unused space 1104, are set to a mid-tone point for the bit depth of the frame. i.e. five hundred and twelve (512) for a 10-bit frame. Sizes of the feature maps are dependent on the CNN backbone 114. For a 'Darknet-53' backbone, sizes may be 136×76 for feature map 1110, with two-hundred and fifty six (256) instances, 68×38 for feature map 1112, with five hundred and twelve (512) instances, and 34×19 for feature map 1120, with one-thousand and twenty four (1024) instances. For clarity, FIG. 12 shows a frame 1202 comprising fewer feature maps than are present in typical applications, however the three layers and relative resolutions are represented in FIG. 12 as described below. Different CNNs and different divisions between the 'backbone' and the 'head' sections of the CNN may result in different dimensions and number of feature maps for each layer, and differing number of layers (i.e. quantities other than three layers).

In placing feature maps in the two-dimensional array in the form of the monochrome frame 1102, feature maps of the same group of frames are placed adjacent in the frame 1102. For example, group 1106 contains feature map 1110, with group 1108 and group 1109 containing the remaining feature maps in the layer. Likewise, group 1114 contains feature map 1112, with two additional groups for the layer. For brevity, grouping is not shown for the layer containing the smallest feature maps (i.e. feature map 1120), however the same groupwise packing approach is used. Within each group, feature maps are present in a determined ordering and the placement in the monochrome frame 1102 reflects the ordering.

In placing feature maps into the monochrome frame 1202 of FIG. 12 alignment to a specific boundary, such as a 4×4 grid boundary, may be maintained. Where feature map sizes are not a multiple of such alignment, unused sample space is present between the adjacent feature maps. For example, a feature map of size 34×19 is placed occupying a 36×20 sample area, with the unused space occupied by mid-tone sample values. The presence of unused space between feature maps reduces occurrence from coding artefacts in one feature map caused by content in an adjacent feature map and improves the alignment of the feature maps to the underlying block structure of the video codec. For example, for VVC, a minimum block size of 4×4 is typically used.

In addition to aligning feature maps to a specific alignment grid, a minimum padding between feature maps, such as two samples, may also be enforced. The minimum padding helps prevent artefacts in one feature map caused by content in an adjacent feature map in cases where the feature map size is a multiple of the alignment grid. For example, a feature map of size 136×76 fits onto a 4×4 alignment grid with no inserted unused sample space between itself and the adjacent feature maps. A minimum padding area ensures some separation between adjacent feature maps, which may help reduce coding artefacts crossing from one feature map to an adjacent feature map.

FIG. 12 is a schematic block diagram showing an alternative feature map packing arrangement 1200 in monochrome frame 1202. The feature map packing arrangement 1200 is suitable for feature map groupings where numerous groupings of four feature maps are present. The groupings of FIG. 12 may be based on spatial similarity between feature maps, resulting in groupings of similar feature maps. Spatial similarity may be measured using sum-of-absolute-differences or sum-of-squared-differences or some other similarity measure. The groupings apply to feature maps within the same layer and do not span across multiple layers. As seen in FIG. 12, a grouping 1210 includes four feature maps. The feature maps of the grouping 1210 are placed in the monochrome frame 1202 using a sample-wise interleaving to occupy an area 2×2 of the component feature maps. Sample-wise interleaving results in the higher structural detail of the four feature maps being shared by the same coding tree structure, with detail between the four feature maps varying from sample to sample. Accordingly, a common coding tree structure and shared residual (except for local differences necessary to code the adjacent samples of different feature maps) is achieved, resulting in an increase in compression efficiency. Once all groups of size four have been packed into the monochrome frame 1202 for a given layer, the remaining feature maps, such as feature map 1214, are packed adjacently, based on grouping but not in an interleaved manner. The remaining feature maps may be assigned to groups of any size as their group composition does not affect the packing process, aside from the order of packing. For the next layer, groups of four, such as group 1220 are packed in a sample-wise interleaved manner followed by feature maps belonging to groups of other sizes, such as feature map 1224. For the final layer, groups of four, such as group 1230 are packed in a sample-wise interleaved manner followed by feature maps belonging to groups of other sizes, such as feature map 1234.

Figure 13:
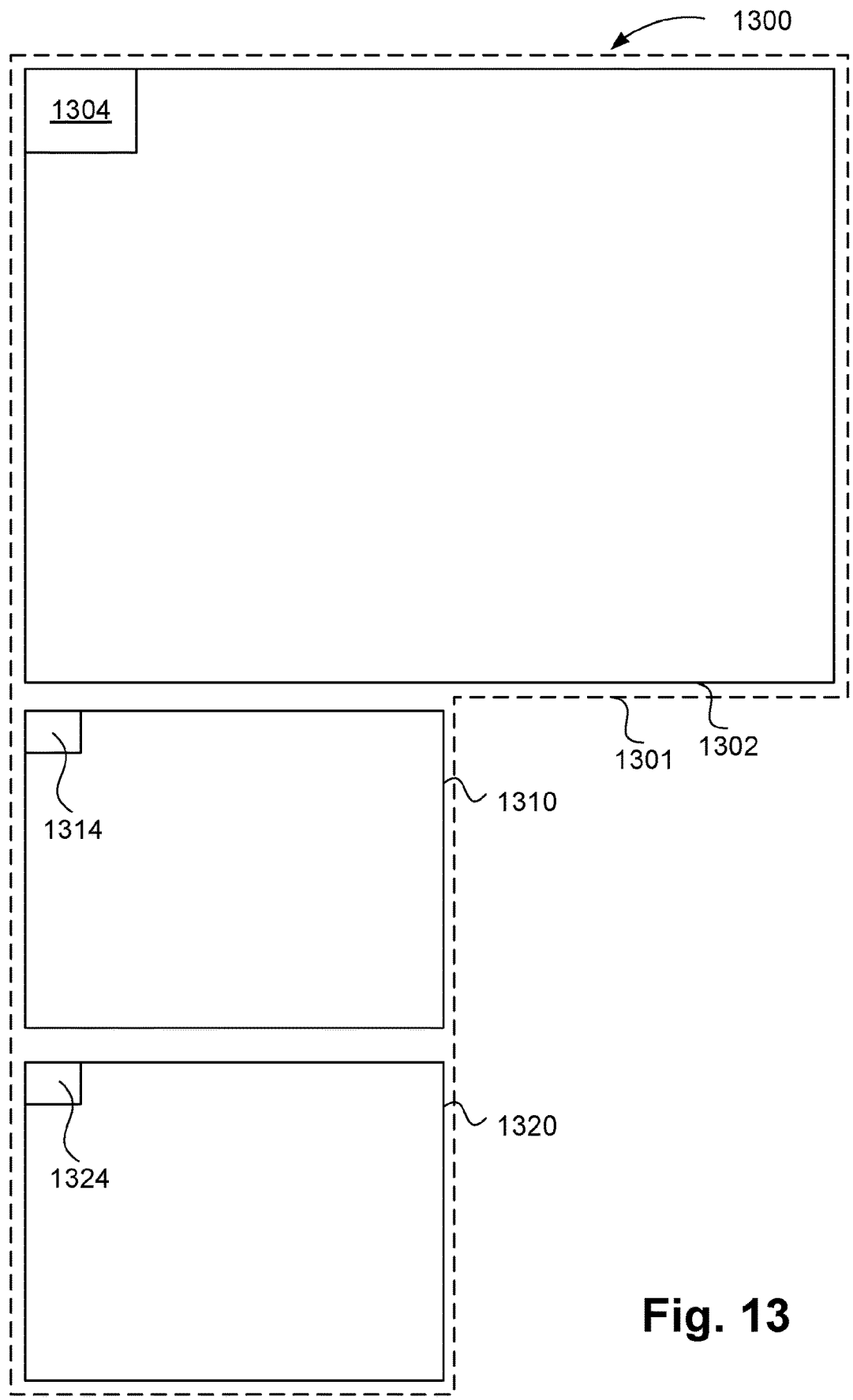
FIG. 13 is a schematic block diagram showing a feature map packing arrangement in a 4:2:0 chroma subsampled colour frame.

FIG. 13 is a schematic block diagram showing a feature map packing arrangement 1300 in a 4:2:0 chroma sub-sampled colour frame 1301. Feature map groups containing two or three feature maps that have a high degree of similarity and belonging to different layers are placed in different colour channels in collocated regions of the colour frame 1301. As such, positions of at least part of a first feature map in one layer relatively corresponds to positions of a least part of a second feature map in another layer. For two feature maps in adjacent layers, the larger feature map is placed in a luma plane 1302, such as feature map 1304. The smaller feature map of the two feature maps is placed in a chroma plane 1310, such as feature map 1314. Where a group includes three feature maps, the third feature map being smaller in size than the feature map placed in the chroma plane 1310, the third feature map is packed into a second chroma plane 1320 such that the size is doubled, resulting in a doubled packed feature map 1324. As the two or three feature maps of the group were grouped based on spatial similarity, in the example of FIG. 13, coding tools targeting inter-channel correlation are available to improve compression efficiency when coding the colour frame 1301. For example, tools that attempt to predict chroma samples from luma based on models of the difference, such as linear models targeting cross-colour component prediction, may be applied. For inter slices, where a shared coding tree specifies luma and chroma coding blocks, the block structure of the two or three feature maps is coded using a single coding tree, instead of requiring separate coding trees as would be the case had the feature maps been placed at different locations.

Figure 14:
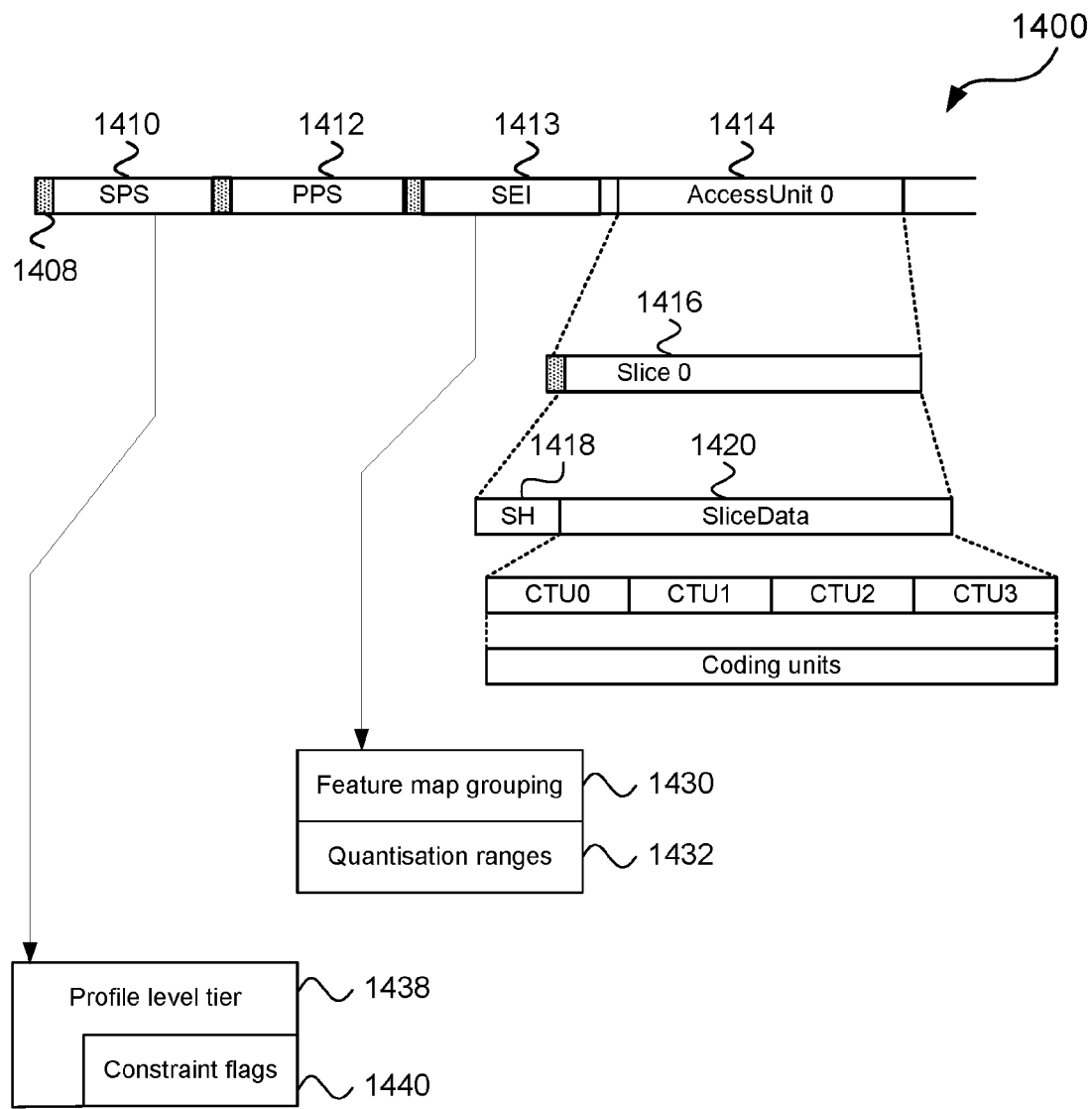
FIG. 14 is a schematic block diagram showing a bitstream holding encoded packed feature maps and associated metadata.

FIG. 14 is a schematic block diagram showing a bitstream 1400 holding encoded packed feature maps and associated metadata. The bitstream 1400 corresponds to the bitstream 121 produced by the video encoder 120 or the bitstream 143 decoded by the video decoder 134. The bitstream contains groups of syntax prefaced by a 'network abstraction layer' unit header. For example, a NAL unit header 1408 precedes a sequence parameter set (SPS) 1410. The SPS 1410 may include a 'profile level tier' (PLT) unit of syntax 1438, which may include a 'general constraint info' (GCI) unit of syntax (i.e. constraint flags 1440). The constraint flags 1440 are present in the SPS 1410 when a 'gci_present_flag' is present in the SPS 1410 and equal to one, otherwise the constraint flags 1440 are not present in the SPS 1410. When constraint flags are present in the SPS 1410, any one being activated indicates that the bitstream 1400 conforms to a restricted subset (which may correspond to a sub-profile) of the tools or functions indicated in the signalled profile of the bitstream 1400. When constraint flags are not present in the SPS 1410, each constraint flag that would otherwise be signalled is inferred to have a value of zero and the bitstream conforms to the signalled profile of the bitstream 1400. Each flag in the constraint flags 1440, when set, indicates the disablement of a particular tool in the VVC standard, with the semantics of the flag defined in the VVC standard. A separate set of syntax elements (ptl_num_sub_profiles and zero or more instances of a general_sub_profile_idc syntax elements) identify a particular sub-profile to which the bitstream conforms, with the definition of the sub-profile defined outside of the VVC standard. The GCI includes a set of flags with each flag constraining a particular coding tool to not be used in the bitstream 1400. The PLT 1438 may signal a specific set of tools may be used in the bitstream 1400, the specific set of tools known as a 'profile'. An example of a profile is "Main 10", offering 8- to 10-bit video with either a 4:0:0 or a 4:2:0 chroma format and targeting widespread deployment. The GCI may indicate a further constraint on the set of tools of a profile into a subset of the tools, which may correspond to a sub-profile. Generally, when the video encoder 120 is encoding video samples (i.e., from the video source 112 via the multiplexor 118), all tools of a given profile may be used to efficiently encode the frame data. When the video encoder 120 is encoding feature maps packed into frames (i.e., from the module 116), certain tools of the VVC standard no longer provide compression benefit. Tools that do not provide compression benefit for packed feature maps do not need to be tried by the video encoder 120 and may be signalled in the GCI as not being used in the bitstream 1400. The SPS 1410 also indicates the chroma format, the bit depth, the resolution of the frame data represented by the bitstream 1400.

A picture parameter set (PPS) 1412 includes syntax elements controlling lower-level behaviour of tools including control of the deblocking filter. The PPS 1412 includes a pps_deblocking_filter_control_present_flag that, when set, indicates that the deblocking filter settings are controlled in the PPS 1412. When the pps_deblocking_filter_control_present_flag is set, a pps_deblocking_filter_disabled_flag is present in the PPS 1412. When the pps_deblocking_filter_disabled_flag is present in the PPS 1412 and set to one, the deblocking filter is disabled for all pictures referencing the PPS 1412, unless further overriding of deblocking control occurs in a picture header or a slice header 1418 of the picture. When the pps_deblocking_filter_disabled_flag is present in the PPS 1412 and set to one, a pps_deblocking_filter_override_enabled_flag is present in the PPS 1412. When the pps_deblocking_filter_override_enabled_flag is present and set to one in the PPS 1412, the slice header 1418 or picture header of each picture includes additional flags that may override the enablement or disablement of the deblocking filter indicated by the pps_deblocking_filter_disabled_flag.

An SEI message 1413 encodes a feature map grouping 1430, as determined by the group determiner module 510 and quantisation ranges 1432, as determined by the range determiner module 514. Appendix A shows example syntax and semantics for the SEI message 1413. The packing format used by the packer module 522 may also be encoded in the SEI message 1413, using an index to select one feature packing format from an enumeration of all available feature packing formats. The particular CNN backbone that was used to produce the feature maps may also be indicated in the SEI message 1413 using an index to select one CNN backbone from an enumeration of a set of predetermined CNN backbones, some or all of which are available to the source device 110. From the CNN backbone type index, the number of layers and number of channels in each layer and resolution of each feature map in each layer may be determined. For groupings where feature maps within a given group are in the same layer, separate group lists of feature map indices are coded for each layer. For groupings where feature maps within a given group may span multiple layers, a feature map index and layer index pair are coded as items in each group. For groupings where at most one feature map in each layer is present, and those that are present are in adjacent layers, the layer index is only needed for the first feature map in the group. If the group includes feature maps of all layers, for example all three layers, no group index is required as the feature map indices apply implicitly to one feature map in each layer. If all feature maps of a given layer belong to one distinct layer, then the one quantisation range per layer is coded.

Each frame is encoded in the bitstream 1400 as an 'access unit', such as access unit 1414 as seen in FIG. 14. Each access unit includes one or more slices, such as slice 1416. For the first access unit of a bitstream and generally for a 'random access point' access unit, intra slices are used to avoid any prediction dependency on other access units in the bitstream 1400. The slice 1416 includes a slice header 1418 followed by slice data 1420. The slice data 1420 includes a sequence of CTUs, providing the coded representation of the frame data. The CTU is square and typically 128×128 in size, which is not well aligned to typical feature map sizes. The alignment of feature maps to a minimum block size, such as a 4×4 grid partially ameliorates this misalignment.

Figure 15:
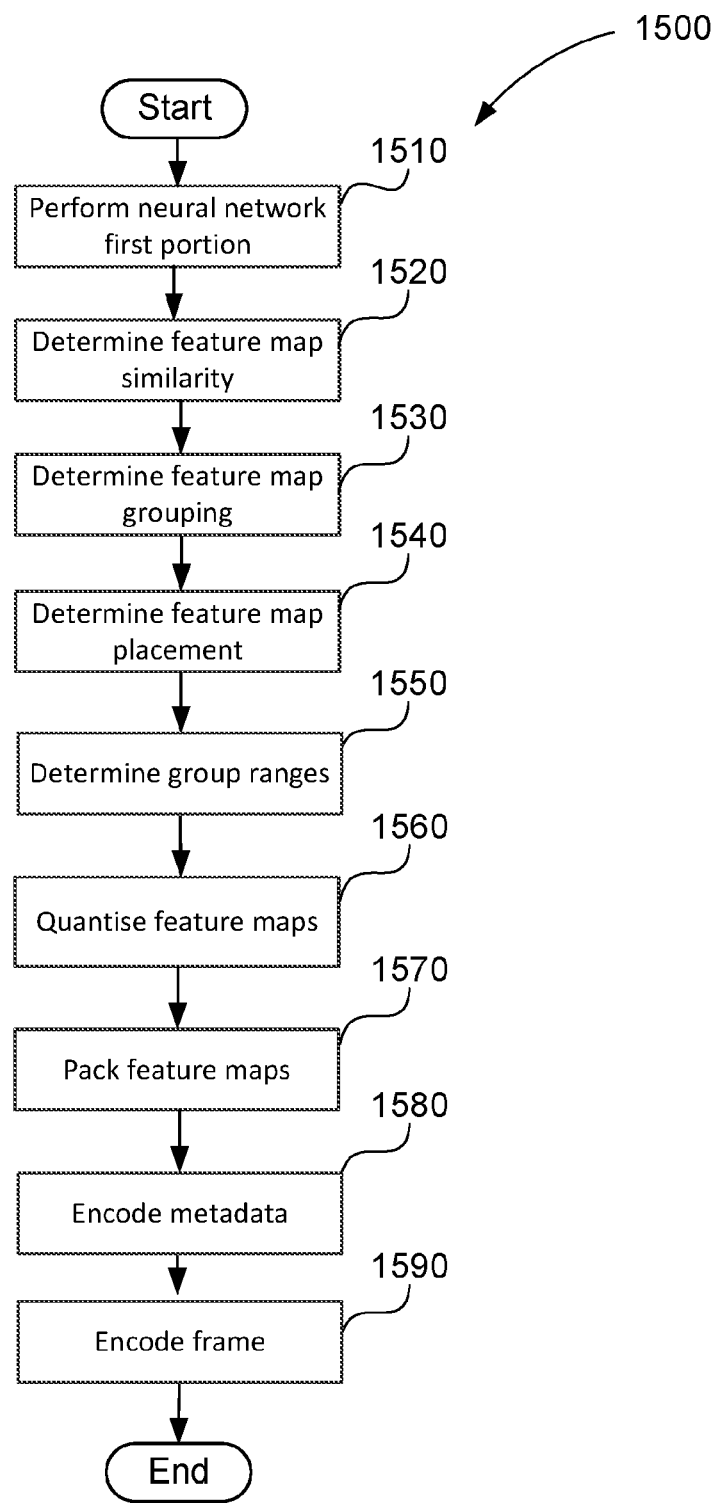
FIG. 15 shows a method for performing a first portion of a CNN and encoding resulting feature maps.

FIG. 15 shows a method 1500 for performing a first portion of a CNN and encoding the resulting feature maps for a frame of video data. The method 1500 may be implemented using apparatus such as a configured FPGA, an ASIC, or an ASSP. Alternatively, as described below, the method 1500 may be implemented by the source device 110, as one or more software code modules of the application programs 233, under execution of the processor 205. The software code modules of the application programs 233 implementing the method 1500 may be resident, for example, in the hard disk drive 210 and/or the memory 206. The method 1500 is repeated for each frame of video data produced by the video source 112. The method 1500 may be stored on computer-readable storage medium and/or in the memory 206.

The method 1500 begins at a perform CNN first portion step 1510. At the step 1510, the CNN backbone 114, under execution of the processor 205, performs a subset of the layers of a particular CNN to convert an input frame 113 into intermediate tensors 115. Due to use of a prediction head or FPN the tensors 115 may contain multiple tensors. The method 1500 operates to encode tensors corresponding to one frame of video data from the video source 112. Control in the processor 205 then progresses from the step 1510 to a determine feature map similarity step 1520. The intermediate tensors 115 may be stored, for example, in the memory 206 and/or hard disk drive 210.

At the determine feature map similarity step 1520 the module 116, under execution of the processor 205, produces a similarity matrix containing a measure of the similarity of each feature map with each other feature map within each layer. The similarity matrix may be stored, for example, in the memory 206 and/or hard disk drive 210. The similarity measure may be mean squared difference (MSE) of two feature maps or sum of absolute differences (SAD) of two feature maps or some other measure of difference. Where it is desired to measure similarity of feature maps in different layers, the feature maps having a lower spatial resolution may be upscaled (e.g. using nearest neighbour interpolation), to produce a compatible resolution with the higher spatial resolution for the purpose of difference measurement. To reduce computational overhead, the step 1520 is performed infrequently, for example, only on the first picture of a CLVS, or on each random-access point in a CLVS. Control in the processor 205 then progresses from the step 1520 to a determine feature map grouping step 1530.

At the determine feature map group step 1530 the group determiner 510, under execution of the processor 205, determines sets of groups to which feature maps are assigned. The groups of feature maps may be stored, for example, in the memory 206 and/or hard disk drive 210. Operation of the group determiner 510 is described with reference to FIG. 17. The step 1530 needs to be performed when the similarity matrix of the step 1520 has been determined, for example, on the first picture of a CLVS or on every random-access point in the CLVS. Control in the processor 205 progresses from the step 1530 to a determine feature map placement step 1540.

At the determine feature map placement step 1540 the packer module 522, under execution of the processor 205, determines the location at which each feature map will be placed in a frame. When the frame is a monochrome frame, the feature maps are placed in a raster scan order filling the frame area, with the frame area initialised based on the total area of all feature maps to be packed into the frame and a target aspect ratio. Packing arrangements are described with reference to FIGS. 11-13. The packing format in use is determined from a 'packing_format' syntax element decoded from the SEI message 1413, described with reference to Appendix A. Feature maps belonging to a given group are sequentially packed and packed in the order in which the feature maps are listed in the respective group. Groups of size two or three feature maps, with each feature map belonging to a different layer are packed collocated spatially but in different colour channels, as described with reference to FIG. 13. As the number and size of feature maps does not change during operation of the source device 110, the placement may be determined once and saved for use with subsequent frames. The packed frame may be stored, for example, in the memory 206 and/or hard disk drive 210. Control in the processor 205 then progresses from the step 1540 to a determine group ranges step 1550.

At the determine group ranges step 1550 the range determiner 514, under execution of the processor 205, determines the range of the floating-point data in each group of feature maps determined in step 1530. The determined ranges may be stored, for example, in the memory 206 and/or hard disk drive 210. For symmetric operation, the range for the group is the largest magnitude (absolute) value of the values in the feature maps belonging to the group. The range provides a value for normalisation of the feature map data prior to conversion and quantisation to integer sample values. For asymmetric operation, a positive and negative range is determined for each group of feature maps, indicating the largest positive and largest negative value encountered within the group of feature maps. A quantisation range is determined for each group of feature maps in the tensors 115. The quantisation ranges may be determined for tensors of every frame of video data, or a less frequent update may be applied. To reduce signalling overhead, quantisation ranges may be determined for intra pictures or random-access pictures only in the video bitstream. The range of floating-point data tensors of a subsequent frame, where the quantisation range was not determined, may exceed the earlier determined quantisation ranges. A safety margin may be introduced by increasing the magnitude of the determined quantisation ranges by some specified scaling factor. Multiplying quantisation ranges by a fixed factor, for example 8/7, results in compressing the utilised sample range of the data into a range approximately corresponding to video range used in YCbCr video data. Later frames where the quantisation range might not be determined have some headroom to exceed this range up to the limit of the sample bit depth, e.g. [0 . . . 1023] for 10-bit video. Control in the processor 205 then progresses from the step 1550 to a quantise feature maps step 1560.

At the quantise feature maps step 1560 the quantiser module 518, under execution of the processor 205, quantises each feature map from floating point values into integer sample values according to the quantisation range of the group to which the feature map belongs. The determined integer sample values may be stored, for example, in the memory 206 and/or hard disk drive 210. A scaling into a normalised range, with maximum magnitude of 1.0 is firstly performed, followed by a multiplication into the sample range, and addition of an offset, resulting in utilisation of a substantial portion of the sample magnitudes. For 10-bit video, a multiplication factor of five hundred and twelve (512) is used and an offset quant offset of five hundred and twelve (512) is also used. To reduce nonlinear effects from overshoot that may be introduced by the video encoder 120 and the video encoder 144, a smaller multiplication factor may be used. If the quantisation ranges were not already adjusted by a fixed factor, such as 8/7, to align with the video range commonly used in YCbCr video data, a scaling factor scale_f of 7/8*512=448 may be used. For 8-bit video data, an offset of one hundred and twenty-eight (128) and a scaling factor of one hundred and twenty-eight (128), or one hundred and twelve (112) for video range-aligned operation, may be used. In the case where quantisation ranges were determined for tensors from a previous frame and have not been updated for the current frame, it is possible for the incoming floating-point value to exceed the quantisation range for the feature map group to which the feature map belongs. To prevent overflow when mapping floating point values to integer sample values a clipping operation is applied. In one arrangement of the quantiser module 518, a clipping of the floating-point value into the range indicated by the quantisation range is applied to prevent overflow. Clipping of floating-point values to the quantisation range ensures that all samples are within the range [quant_offset−scale_f, quant_offset+scale_f]. In another arrangement of the quantiser module 518, clipping is applied after application of quant_offset and scale_f, at which point determined values may fall outside the range indicated by the bit depth, and before conversion into integer sample values. Clipping is applied to ensure that the integer sample values lie within the range indicated by the bit depth, i.e. [0 . . . (1<<bit_depth)−1]. Clipping after scaling and before integer conversion, in combination with a scale_f value that utilises a smaller range, such as a video range, allows some headroom for subsequent frames to exceed the quantisation range determined from an earlier frame. Allowance for some degree of overshoot in the video encoder 120 and video decoder 144 operation before the clipping introduces nonlinear distortion into the conversion from floating point tensor to integer and back to floating point tensor is also present. Control in the processor 205 then progresses from the step 1560 to a pack feature maps step 1570.

At the pack feature maps step 1570 the packer module 522, under execution of the processor 205, packs integer feature maps 520 to produce the packed feature map frame 117. Quantised feature maps 520, corresponding to feature maps from each layer of the tensors 115 may be stored in a memory buffer configured, for example, within the memory 206 and/or hard disk drive 210, holding one frame of video data. Packing formats for the feature maps are described with reference to FIGS. 11-13. Control in the processor 205 then progresses from the step 1570 to an encode metadata step 1580.

At the encode metadata step 1580 the entropy encoder 638, under execution of the processor 205, encodes the feature map groupings 512 and quantisation ranges 516, i.e. the metadata 125 into the bitstream 121. The metadata 125 may be encoded using as the SEI message 1413. The format of the SEI message 1413 is described with reference to Appendix A. Control in the processor 205 then progresses from the step 1580 to an encode frame step 1590. At the first picture (picture order count equal to 0), the 'layers_update', 'groups_update', and 'qr_update' flag in the SEI message 1413 is set and the feature map layer and dimensionality, the feature map group definitions and the associated quantisation ranges are encoded in the bitstream 121. The 'qr_update' flag in the SEI message 1413 may be set periodically, with quantisation range information accordingly updated. For random access configuration, every random access point or intra picture may include updated quantisation ranges. For low-delay configuration, periodic updating of quantisation ranges may occur for inter-pictures, for example one picture approximately every second corresponding to the intra picture periodicity of the random access configuration. Updating quantisation ranges for some inter pictures, e.g. when intra pictures are very rarely occurring in the bitstream, allows continuous adaptation to the data that does not depend on the structure of the bitstream (i.e. intra/inter slice selection).

At the encode frame step 1590 the video encoder 120, under execution of the processor 205, encodes the frame 119 into the bitstream 121. When the source device 110 is configured to encode feature maps, the frame 119 is obtained from the packed feature map frame 117 via the multiplexor 118. When the source device 110 is configured to encode feature maps, the video encoder 120 may use a subset of the coding tools available to a profile of the video coding standard. The subset of coding tools may be signalled using general constraint flags. For example, the "Main10" profile may be signalled in the profile level tier syntax 1438 in the bitstream 120 and general constraint flags 1440 may signal the following tools are not used in the bitstream 120: LFNST (via gci_no_lfnst_constraint_flag), MIP (via gci_no_mip_constraint_flag), LMCS (via gci_no_lmcs_constraint_flag), ISP (via gci_no_isp_constraint_flag), Affine (via gci_no_affine_motion_constraint_flag), GPM (via gci_no_gpm_constraint_flag), MMVD (via gci_no_mmvd_constraint_flag). In addition to the use of GCI flags, or alternatively to their use, a sub-profile may be defined outside of the VVC standard for feature map encoding, and identified within the bitstream using a particular value of a general_sub_profile_idc syntax element that may be included in the SPS 1410. Disabling the deblocking filter results in greater compression efficiency and higher task performance when encoding feature maps. In the VVC coding standard, the deblocking filter is disabled for pictures referencing a picture parameter set in the bitstream 121 having pps_deblocking_filter_disabled_flag set to '1', unless overridden at the slice or picture level by coding sh_deblocking_filter_disabled_flag with a value of '1' or by coding ph_deblocking_filter_disabled_flag with a value of '1'. Deblocking is not explicitly disabled using a constraint flag in the VVC standard version 1 and thus disabling the deblocking filter does not constitute part of a tool subset that may be equivalent to a sub-profile for feature map encoding, even though such disablement shows advantage. The method 1500 completes and processing in the processor 205 proceeds to the next frame.

Figure 16:
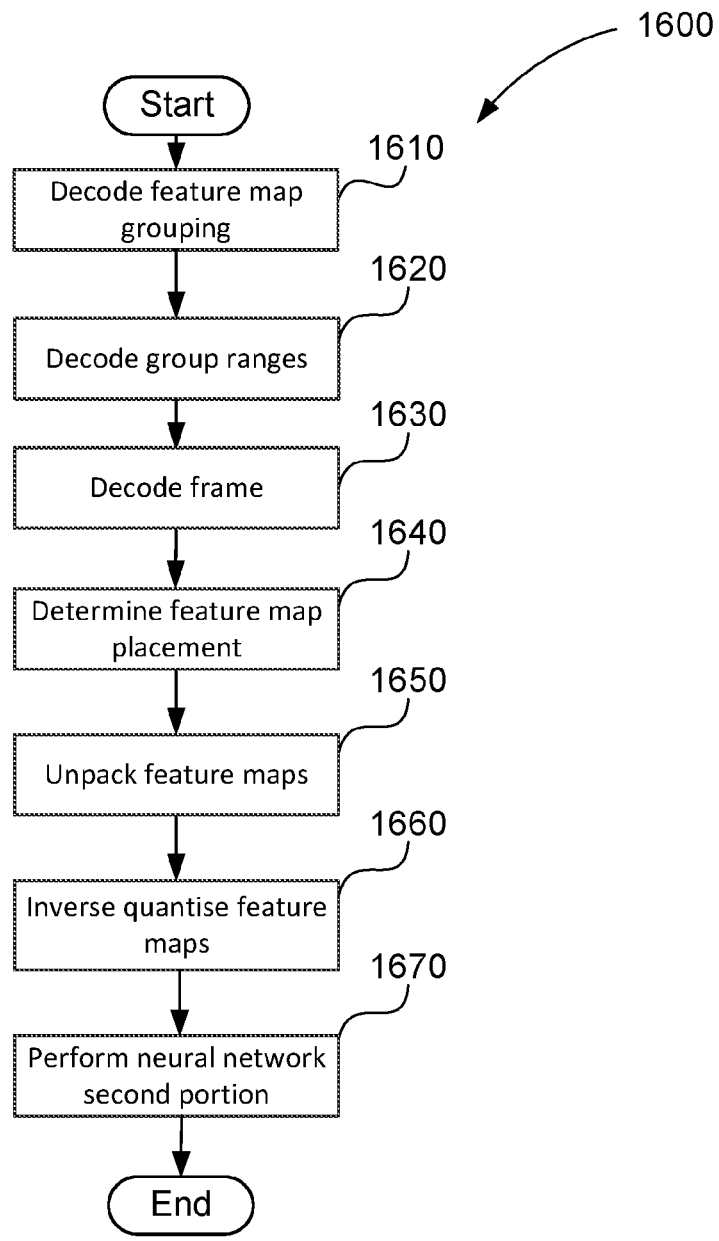
FIG. 16 shows a method for decoding feature maps and performing a second portion of the CNN.

FIG. 16 shows a method 1600 for decoding feature maps from encoded data and performing a second portion of the CNN. The method 1600 may be implemented by apparatus such as a configured FPGA, an ASIC, or an ASSP. Alternatively, as described below, the method 1600 may be implemented by the destination device 140, as one or more software code modules of the application programs 233, under execution of the processor 205. The method 1600 is repeated for each frame of video data encoded in the bitstream 143. The software code modules of the application programs 233 implementing the method 1600 may be stored, for example, on the hard disk drive 210 and/or in the memory 206. The method 1600 commences with a decode feature map groupings step 1610. The method 1600 is configured for determining a parameter or parameters relating to quantisation; and for performing inverse quantisation for data samples decoded from the encoded data to derive the feature maps according to the parameter or parameters. In one arrangement, the method 1600 is configured for deinterleaving feature maps corresponding to a group of feature maps after inverse quantisation is performed. As described in detail below, the method 1600 may be used for determining feature maps based on an image of a first group of feature maps arranged in a first frame (or two-dimensional array) and second group of feature maps arranged in a second frame (or two-dimensional array), where the first frame is different from the second frame.

At the decode feature map groupings step 1610 the entropy decoder 720, under execution of the processor 205, decodes from the SEI message 1413 a structure indicating the assignment of each feature map of each layer to one or more groups of feature maps (i.e. the feature map groups 820). The decoded structure may be stored, for example, in the memory 206 and/or hard disk drive 210. The syntax of the feature map grouping in the SEI message 1413 is described with reference to Appendix A. Control in the processor 205 then progresses from the step 1610 to a decode quantisation ranges step 1620.

At the decode quantisation ranges step 1620 the entropy decoder 720, under execution of the processor 205, decodes a parameter in the form of a quantisation range 822 for each feature map group of 820, as determined at the step 1610 from the SEI message 1413. The quantisation range 822 is shared by each of a plurality of feature maps in a feature map group. The quantisation range 822 determined at step 1620 may be stored, for example, in the memory 206 and/or hard disk drive 210. When symmetric quantisation is in use, a single value is decoded at step 1620 for each feature map group, representing the maximum magnitude of the floating-point data within the feature maps belonging to the respective group. When asymmetric quantisation is in use at step 1620, a pair of values is decoded for each feature map group, representing the maximum and minimum values of the floating-point data within the feature maps belonging to the respective group. The processor 205 may operate to perform the step 1620 on every frame of video data, or the processor 205 may operate to perform the step 1620 less frequently. The step 1620 may be performed in intra pictures or on random access points in the bitstream 143. When the step 1620 is not performed for every frame, the feature map grouping and quantisation range data is carried over subsequent frames for reuse, until a new set of feature map grouping and/or quantisation range data is decoded from the bitstream 143. Control in the processor 205 then progresses from the step 1620 to a decode frame step 1630.

At the decode frame step 1630 the entropy decoder 114, under execution of the processor 205, operates to produce the frame 145 by decoding a portion of the bitstream 143, corresponding to an access unit, such as AU 1414. The frame 145 may contain packed feature maps or may contain an image corresponding to a frame, for example from the video source 112. If the frame 145 contains an image frame, that is, does not contain packed feature maps, the method 1600 terminates and decoding progresses to then next frame. The frame 145 produced at step 1630 may be stored, for example, in the memory 206 and/or hard disk drive 210. If the frame 145 contains packed feature maps, the processor 205 progresses from the step 1630 to a determine feature map placement step 1640.

At the determine feature map placement step 1640 the unpacker module 810, under execution of the processor 205, determines the location of each feature map of each layer in the frame 145. Using the spatial size of each feature map, the feature map groupings, and the number of feature maps in each layer, placement information is determined in accordance with the approach of the step 1540 and as described with reference to FIGS. 11-13. Where the feature map size, quantity and packing format is unchanged compared to a previous frame, feature map placement data is retained from the previous frame. Control in the processor 205 then progresses from the step 1640 to an unpack feature maps step 1650.

At the unpack feature maps step 1650 the unpacker module 810, under execution of the processor 205, extracts samples from the frame 147 to produce integer feature maps 812 according to the determined feature map placement from the step 1640. The integer feature maps 812 determined at step 1650 may be stored, for example, in the memory 206 and/or hard disk drive 210. Control in the processor 205 then progresses from the step 1650 to an inverse quantise feature maps step 1660.

At the inverse quantise feature maps step 1660 the inverse quantiser module 814, under execution of the processor 205, converts the integer feature maps 812 into floating point feature maps, assembled into the tensors 149 as input to the CNN head 150. The floating point feature maps may be stored, for example, in the memory 206 and/or hard disk drive 210. The integer samples are converted to floating point precision and the quant offset and scale f values of the step 1560 are used to shift the samples into a normalised range. For each feature map in a feature map group, the normalised range values are multiplied by the quantisation range 822 for the feature map group of 820 to create floating point feature maps. The floating-point feature maps are assembled into tensors 119 as multidimensional arrays, generally the dimensions being (frame, channel, height, width). Where an FPN is used, assembly operates to write the feature map to one tensor out of the set of tensors in 119 corresponding to the FPN layer. Control in the processor 205 progresses from the step 1660 to a perform CNN second portion step 1670.

At the perform CNN second portion step 1670 the CNN head 150, under execution of the processor 205, performs the remaining stages of the CNN (i.e. the stages specific to a particular task). The decoded, unpacked and inverse quantised tensors 149 are input to the CNN head 150. Within the CNN head 150 a series of convolutions, normalisations, fully connected layer operations, and activation stages are performed leading to a CNN result 151. The CNN result 151 is stored in the task result buffer 152, for example, configured within the memory 206. The method 1600 terminates and control in the processor 205 progresses to the next frame.

In an arrangement of the method 1600, the steps 1610 and 1620 are performed when indicated by flags in the SEI message 1413. The step 1610 is performed when indicated by a 'groups_update' flag, decoded from the SEI message 1413 and the step 1620 is performed when indicated by a 'qr_update' flag, also decoded from the SEI message 1413.

Figure 17:
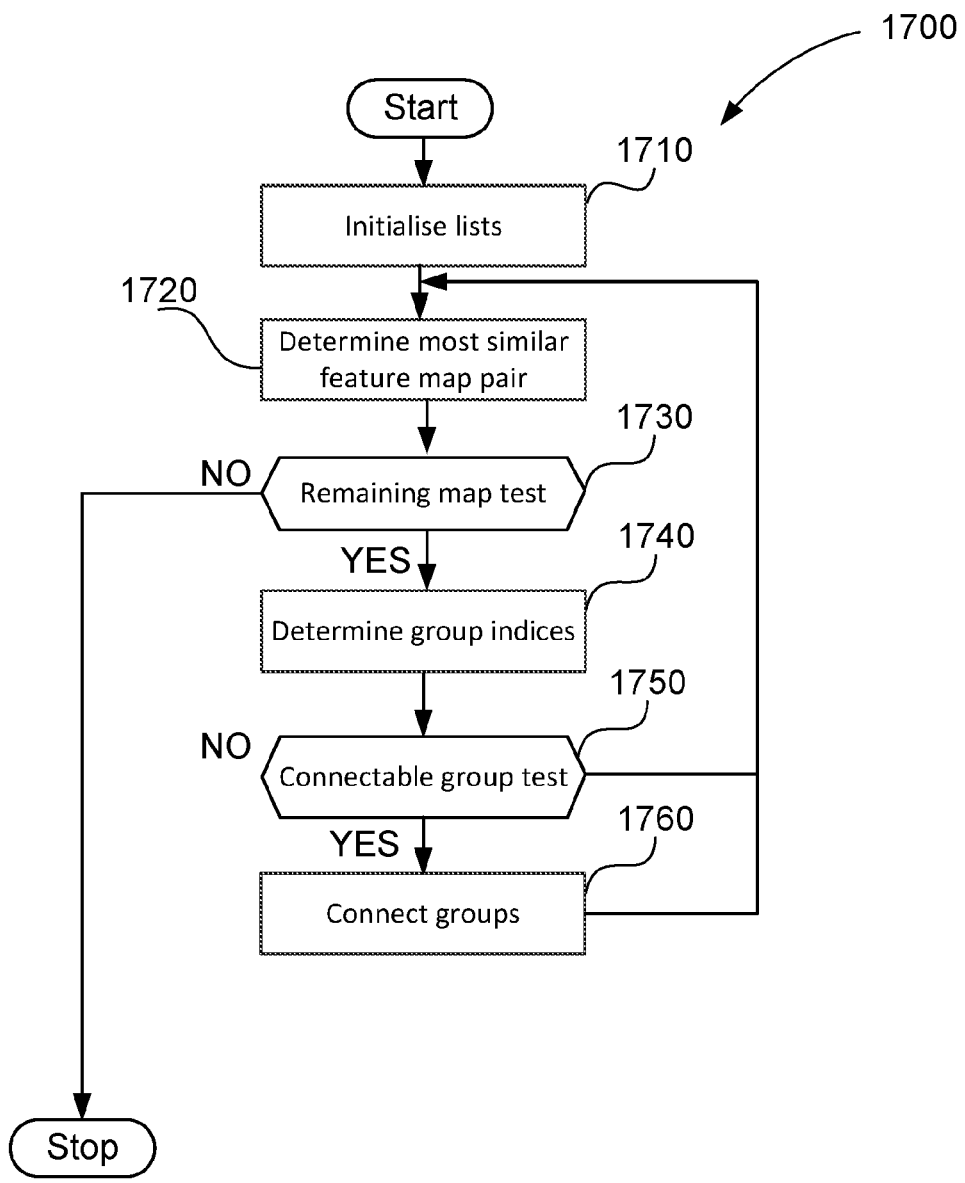
FIG. 17 shows a method of determining groupings of feature maps.

FIG. 17 shows a method of determining groupings of feature maps. The method 1700 may be embodied by apparatus such as a configured FPGA, an ASIC, or an ASSP. Alternatively, as described above, the method 1700 may be implemented by the source device 110, as one or more software code modules of the application programs 233, under execution of the processor 205. The software code modules of the application programs 233 implementing the method 1700 may be stored, for example, on the hard disk drive 210 and/or in the memory 206. The method 1700 commences with an initialise lists step 1710.

At the initialise lists step 1710 the group determiner 510, under execution of the processor 205, creates a set of groups such that each feature map in a given layer is assigned to a single group. A group is represented as an ordered list of feature maps, with adjacency within one group to indicate similarity of the pair of feature maps. The ordered list may be initialised and stored in the memory 206 and/or hard disk drive 210. Control in the processor 205 then progresses from the step 1710 to a find most similar feature map pair step 1720.

At the step 1720 the group determiner 510, under execution of the processor 205, determines the pair of feature maps in the similarity matrix from step 1520 with the greatest similarity. As the similarity matrix is a measure of difference between feature maps, the pair with the greatest similarity is identified by the location in the matrix with the minimum value. If the similarity matrix indicates no further pairs of feature maps have similarity (i.e. all entries have been set to 'not-a-number' (NaN)), this value is returned. Control in the processor 205 then progresses from the step 1720 to a remaining map test step 1730.

At the remaining map test step 1730 the group determiner 510, under execution of the processor 205, determines if all pairs of feature maps have been identified at step 1720. If the step 1720 returned a NaN, then the groups of every feature maps have been considered for joining and there is no further need to connect groups together (i.e., forming one larger group out of two smaller groups). If there is no further need to connect groups together, the method 1700 terminates, with the set of groups as a result. Otherwise, if a pair of feature maps with a measured similarity (i.e. result of minimum operation is not a NaN), control in the processor 205 then progresses from the step 1730 to a find group indicates step 1740.

At determine group indices step 1740 the group determiner 510, under execution of the processor 205, determines to which groups the respective feature maps belong and the indices within each group of the feature maps. Control in the processor 205 then progresses from the step 1740 to a connectable group test step 1750.

At connectable group test step 1750 the group determiner 510, under execution of the processor 205, determines if the pair of feature maps can be connected, forming one larger group or not. If either feature map is in the middle of a corresponding group, it is not possible to connect the feature maps together, as a node in a list may only have a predecessor and a successor node. The entry in the similarity matrix corresponding to the pair of feature maps is set to NaN, preventing further consideration of this pair of feature maps. Also, if the two feature maps belong to the same group, then the entry in the similarity matrix corresponding to the pair of feature maps is set to NaN, preventing further consideration of joining these two feature maps. If both feature maps are at the beginning or end of their respective groups then the feature maps are able to be connected together, forming one larger group from the two initial groups. In arrangements where the group size is limited to a specific number of feature maps, for groups that are able to be joined, if the resulting group size would exceed the group size restriction, the entry in the similarity matrix corresponding to the pair of feature maps is set to NaN' and the groups are not joined together. To reduce iterations to determine feature map groups, if the group size is limited and, after joining, the resulting group is equal to the group size, then rows and columns in the similarity matrix corresponding to each end-point of the newly formed group are set to NaN, preventing further considering of these feature maps for joining into larger groups. If the groups are to be connected, then control in the processor 205 progresses to a connect groups step 1760.

At the connect groups step 1760 the group determiner 510, under execution of the processor 205, connects the two groups containing the pair of feature maps identified at the step 1720 together. The groups are connected such that the pair are adjacent in the newly formed larger group. The connected groups determined at step 1760 may be stored, for example, in the memory 206 and/or hard disk drive 210. When a feature map is in a former group of two or more feature maps and is connected to another group, the feature map now occupies some location in the middle of the newly formed larger group. When a feature map becomes a middle node in a list or group, the row and column in the similarity matrix corresponding to that feature map are set to NaN, preventing further consideration of joining that feature map to other groups. The processor 205 then progresses from the step 1760 to the step 1720 to determine the next pair of feature maps to consider for joining into a larger group.

In one arrangement, all feature maps within each layer are merged into one group. When packed in accordance with the packing format 1100, the resulting feature map placement puts similar feature maps relatively close together. The intra block copy coding tool of VVC may then be used to predict portions of one feature map from the previous and adjacent feature map, with some restriction on block selection resulting from the IBC virtual buffer. As residuals of feature maps tend to be continuous and more efficiently coded using various transforms, the IBC search may use a Hadamard transform as a cost estimate in addition or instead of a SAD cost estimate.

In another arrangement, the group size is limited to four. When the group size is limited to four, the 'group of four' feature maps may be placed using the sample-wise interleaving packing format 1200 to achieve compression efficiency from a shared block structure and some degree of shared prediction signal amongst the four feature maps. A similarity threshold may be applied in execution of the method 1700 so that only groups of four feature maps are determined where the four feature maps are highly similar. Other, less similar, feature maps may be assigned to one larger remainder group, which is packed in a raster scan format.

In yet another arrangement, the groups may be determined across layers and limited in size to three, especially suited to three-layer FPNs. Inter-layer groupings are packed in a collocated manner using the packing arrangement 1300, allowing cross-component prediction tools of VVC to be used in improve compression efficiency. A combination grouping is possible where inter-layer groups are used to collocate feature maps across layers while an intra-layer grouping arranges the groups based on the layer occupying the luma channel of the frame.

In yet another arrangement, there is one group per layer and all feature maps of a layer are present in the group for the layer. Within the group, the ordering of feature maps is encoded, permitting similar feature maps within the layer to be placed nearby so that tools such as IBC can predict one feature map from adjacent feature map(s).

In yet another arrangement, there is one group per layer and within each group the feature maps are placed according to the channel index of their tensor. In such arrangements, one quantisation range per layer is coded, resulting in low overhead for quantisation range coding in the SEI message 1413.

As various grouping approaches are possible, a 'grouping_type' syntax element is included in the SEI message 1413 and described further with reference to Appendix A.

Figure 18:
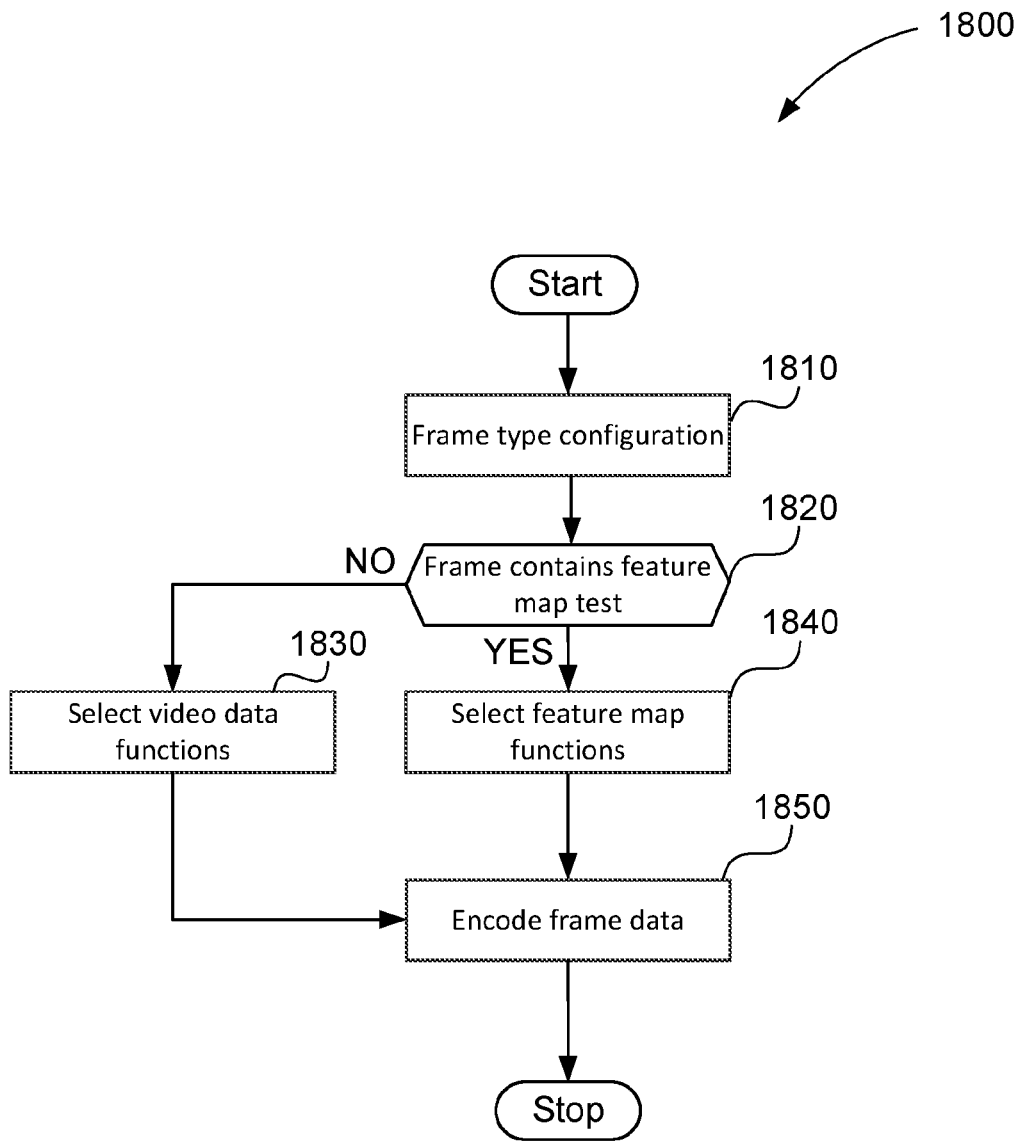
FIG. 18 shows a method for selecting a set of coding tools or functions from a video standard; and Appendix A is a syntax table showing a supplementary enhancement information (SEI) message format for representing metadata associated with feature map packing and quantisation in a bitstream.

FIG. 18 shows a method for selecting a set of coding tools or functions of a video standard according to the type of frame data to be encoded. The method 1800 may be implemented by apparatus such as a configured FPGA, an ASIC, or an ASSP. Alternatively, as described below, the method 1800 may be implemented by the source device 110, as one or more software code modules of the application programs 233, under execution of the processor 205. The software code modules of the application programs 233 implementing the method 1800 may be stored, for example, on the hard disk drive 210 and/or in the memory 206. The steps of the method 1800 are configured for determining whether the source device 120 generates encoded video data including encoded data of a feature map based on a convolution neural network (CNN). The steps of the method 1800 are also configured for generating encoded video data using a plurality of coding tools or functions for encoding video data, in a case where the source device 120 generates the encoded data including encoded video data of a feature map. As also described, the steps of the method 1800 are configured for generating the encoded data of the feature map using a first part of the plurality of coding tools or functions but not using a second part of the plurality of coding tools or functions, in a case where the source device 120 generates the second encoded data including the encoded data of the feature map.

The method 1800 commences with determine frame type configuration step 1810.

At the frame type configuration step 1810 the source device 110, under execution of the processor 205, is configured to operate on either video data or feature map data. The configuration may be the result of receiving a command over the network 200 or 222 or by direct user control via a user interface (e.g. via keyboard 202, mouse 203). Control in the processor 205 then progresses from the step 1810 to a frame contains feature map data test step 1820.

At the step 1820 the source device 110, under execution of the processor 205, determines whether the source device 110 generates encoded regular video frame data or encoded feature map data based on a convolution neural network (CNN). The encoded data is compliant with a coding standard (e.g., the VVC standard). When the source device 110 is configured for video frame data, control in the processor 205 progresses from the step 1820 to a select video data functions step 1830. When the source device 110 is configured for feature map transmission, control in the processor 205 progresses from the step 1820 to a select feature map functions step 1840.

At the select video data functions step 1830 the multiplexor 118, under execution of the processor 205, routes the frame data 113 directly to the video encoder 120. A set of functions or coding tools is selected to be used for encoding the frame data 119. The set of functions corresponds to the functions available in a profile of a video coding standard being used to encode the frame data 119. The set of functions corresponds to the first part of the plurality of coding tools or functions described above. For example, the set of functions defined for the "Main 10" profile of the VVC standard may be selected at step 1830. Control in the processor 205 progresses from the step 1830 to an encode frame data step 1850.

At the select feature map functions step 1840 the multiplexor 118, under execution of the processor 205, routes the packed feature maps 117 to the video encoder 120 as the frame data 119. A set of functions or coding tools that is a subset of the coding tools of a profile of the standard is selected for use in encoding the frame data 119. The subset of coding tools may be selected by activating 'constraint flags' to disable specific coding tools or functions of the video coding standard being used to encode the frame data 119. The disabled coding tools or functions, represent the second part of the coding tools or function described above, and may be at least one of: Low-frequency non-separable transform (LFNST), Matrix intra-prediction (MIP), Linear mode chroma scaling (LMCS), Affine prediction mode, Geometric partitioning mode (GPM), ISP, the deblocking filter. In the present example, the prohibition on use of the second part of the coding tools or functions may be indicated using constraint flags. For video coding standards other than VVC, coding tools providing analogous functionality may be similarly disabled. Control in the processor 205 progresses from the step 1840 to the encode frame data step 1850.

At the encode frame data step 1850 the video encoder 120, under execution of the processor 205, encodes the frame data 119 according to a set of functions or coding tools. The method 1800 terminates and the source device 110 progresses to the next frame. As a result of the method 1800, the bitstream 121 includes a clear indication (e.g. in the form of a set of constraint flags appearing early in the bitstream), whether the contained data is regular video data or packed feature map data. In addition, when the bitstream 121 encodes packed feature map data, the SEI message 1413 is present for at least one frame, allowing the destination device 140 to further process the data after decoding the bitstream (e.g. to process the decoded frame data 145 with the modules 148 and 150). In a case where the destination device 140 is only intended to perform the task as per the CNN head 150, the destination device does not need to decode the bitstream 143 when indicated to contain regular video data beyond the initial profile and constraint flag syntax. Destination devices that only output the task result 151 to the task result buffer 152 and that do not output decoded video (e.g. to the display device 160), do not need to implement the coding tools or functions indicated to be disabled via the constraint flags.

In an arrangement of the method 1800, instead of indicating which tools are disabled for feature map coding by setting constraint flags, the tools are indicated by disabling enablement flags, for example in the sequence parameter set or equivalent syntax structure.

In an arrangement of the methods 1500 and 1600, steps 1580 and 1610 encode and decode the feature map group size as a log 2 value (i.e., feature map group sizes need to be a power-of-two value), with an offset of one applied so that a coded value of zero corresponds to a feature map group size of one (1). A 'log 2_group_size_minus1' syntax element is used to encode the feature map group size.

In another arrangement of the methods 1500, 1600, and 1700, the feature map groups are constrained to contain feature maps indexed in monotonically increasing order within a given layer. When feature maps are present by index in monotonically increasing order within each group, the group composition may be encoded using a bitmap to indicate the presence of absence of a given feature map in a group. For a subsequent group, the coded bitmap may be reduced in length to omit feature map indices that have already been assigned to an earlier group.

In an arrangement of the CNN backbone 310, the dimensionality of the tensors and thus the size of the resulting feature maps is selected to be aligned to the block size of the VVC standard. With generally rectangular video and a default CTU size of 128×128, the feature map widths and heights may be powers of two, e.g. the sizes for the three layers may be 128×64, 64×32, and 32×16. Feature map sizes being powers of two results in greater alignment of the packed features with available block sizes in the VVC standard resulting from quadtree, binary, or ternary splits and reduced potential for coding artefacts in one feature map being caused by the contents of an adjacent feature map.

In an arrangement of the bitstream 1400, the SPS 1410 includes an sps_deblocking_filter_enabled_flag to control the deblocking filter, as additional syntax present when an SPS extension is active via the flag an 'sps_extension_flag' being equal to one. When the sps_deblocking_filter_enabled_flag is equal to zero, the pps_deblocking_filter_control_present_flag in the PPS 1412 must be set to one, so the deblocking filter control is explicitly coded, the pps_deblocking_filter_override_enabled_flag in the PPS 1412 must be set to zero, so slice header or picture header overriding of deblocking control set in the PPS 1412 is prohibited, and the pps_deblocking_filter_disabled_flag in the PPS 1412 must be set to zero, to disable the in-loop filtering. When the sps_deblocking_filter_enabled_flag is equal to one, these constraints on the pps_deblocking_filter_control_present_flag, the pps_deblocking_filter_override_enabled_flag, and the pps_deblocking_filter_disabled_flag flags do not apply. A gci_no_deblocking_filter_flag is present in the constraint flags 1440 and when set to one, the sps_deblocking_filter_enabled_flag in the SPS 1410 must be set to zero. When the gci_no_deblocking_filter_flag is set to zero, no constraint applies to the sps_deblocking_filter_enabled_flag in the SPS 1410. If the sps_deblocking_filter_enabled_flag is not present in the SPS 1410, the constraints applicable to the pps_deblocking_filter_control_present_flag, the pps_deblocking_filter_override_enabled_flag, and the pps_deblocking_filter_disabled_flag flags apply when the gci_no_deblocking_filter_flag is set to one. Explicitly prohibiting deblocking filter application via a constraint flag allows a sub-profile to be defined for feature map encoding that excludes application of the deblocking filter. The gci_no_deblocking_filter_flag may be present in a region of the constraint flags 1440 that contains gci_reserved_zero_bits in version 1 of the VVC standard. When the application of the system 100 requires high quality, i.e. high bitrate, achieved using low values of the quantisation parameter 692, deblocking may be unnecessary and a constraint flag may be used, e.g. for feature map encoding, may omit deblocking altogether.

INDUSTRIAL APPLICABILITY

The arrangements described are applicable to the computer and data processing industries and particularly for the digital signal processing for the encoding and decoding of signals such as video and image signals, achieving high compression efficiency. Provision of one or more of the constraint flags described above allows selection of subsets of tools of a given profile (equivalent to "sub-profiling"). Selection of a subset of tools offers some benefit such as an implementation benefit of vendors of the VVC as the vendors are able to specify subsets of a profile that exclude an unnecessary or otherwise problematic coding tool, for example from a complexity standpoint.

Arrangements for quantising floating-point tensor data in groups of channels, or feature maps, and packing the resulting integer values into planar frames are also disclosed. Grouping methods and trade-off very coarse grouping, with low overhead for quantisation range data, and very fine granularity of grouping, with high overhead for quantisation range data, are disclosed, with intermediate granularities of grouping providing task performance benefits.

The foregoing describes only some embodiments of the present invention, and modifications and/or changes can be made thereto without departing from the scope and spirit of the invention, the embodiments being illustrative and not restrictive.

Appendix A: SEI message format and associated semantics for representing metadata associated with feature map packing and quantisation in a bitstream are as follows:

| | Descriptor |
|---|---|
| feature map packing info( payloadSize ) { | |
|   frame_type | u(1) |
|   if( frame_type != 0 ) { | |
|     layers_update | u(1) |
|     groups_update | u(1) |
|     qr_update | u(1) |
|     if( layers_update ) { | |
|       backbone_id | ue(v) |
|       if( backbone_id = = 0 ) { | |
|         layer_cnt | ue(v) |
|         for( layer_idx = 0; layer_idx < layer_cnt; layer_idx++ ) { | |
|           fm_cnt[ layer_idx ] | |
|           fm_width[ layer_idx ] | |
|           fm_height[ layer_idx ] | |
|         } | |
|       } | |
|     orig_source_width | ue(v) |
|     orig_source_height | ue(v) |
|     packing_format | ue(v) |
|     grouping_type | ue(v) |
|     if(ExplicitGrouping ) | |

-continued

|  | Descriptor |
|---|---|
|     group_cnt | ue(v) |
|     quant_type | ue(v) |
| } | |
| if( groups_update != 0 ) { | |
|   for( grp_idx = 0; grp_idx < group_cnt; grp_idx++ ) { | |
|     if( ExplicitGrouping ) { | |
|       if( !qr_update ) { | |
|         if( ExplicitGroupSize ) | |
|           group_size | ue(v) |
|         for( fm_idx = 0; fm_idx < group_size; fm_idx++ ) | |
|           fm_id[ grp_idx ][ fm_idx ] | ue(v) |
|         if( ExplicitLayerId ) | |
|           layer_id[ grp_idx ][ fm_idx ] | ue(v) |
|       } | |
|     } | |
|   } | |
| } | |
| if( qr_update != 0 ) { | |
|   qr_fraction_precision | ue(v) |
|   for( grp_idx = 0; grp_idx < group_cnt; grp_idx++ ) { | |
|     qr_exp[ grp_idx ] | ue(v) |
|     qr_exp_sign[ grp_idx ] | u(1) |
|     qr_fraction[ grp_idx ] | u(v) |
|     if( SecondRangeFlag ) { | |
|       second_qr_exp[ grp_idx ] | ue(v) |
|       second_qr_exp_sign[ grp_idx ] | u(1) |
|       second_qr_fraction[ grp_idx ] | u(v) |
|     } | |
|   } | |
| } | |

Feature Map Packing Info Semantics

The syntax structure specifies information necessary for unpacking feature maps planar frames and converting to tensors for performing an inferencing task.

A syntax element with a descriptor u(n) indicates the syntax element is coded using n bits and interpreted as an unsigned integer value. A syntax element with a descriptor ue(v) indicates the syntax element is coded as an exponential Golomb value and interpreted as an unsigned integer value.

The persistence of the feature map info SEI message is from the associated AU until either the next occurrence of a feature map info SEI message or the end of the CLVS.

frame_type equal to 0 indicates that the AU does not contain packed feature map data. frame_type equal to 1 indicates that the AU does contain packed feature map data.

layers_update equal to 1 indicates that this instance of the feature map packing info SEI message defines the number of layers and dimensionality and quantity of feature maps in each layer.

groups_update equal to 1 indicates that this instance of the feature map packing info SEI message defines the number and composition of feature map groups.

qr_update equal to 1 indicates that this instance of the feature map packing info SEI message signals an update of the quantisation ranges for the feature map groups.

backbone_id indicates type of network backbone and extraction point, implicitly signalling the layer count and dimensionality of the tensors and thus the feature map dimensions. The following table shows a number of predefined network backbones and associated layer count and feature map count and dimensionality:

| backbone_id | layer_cnt | fm_cnt[ layer_idx ] | fm_width[ layer_idx ] | fm_height[ layer_idx ] |
|---|---|---|---|---|
| 0 | (signalled) | (signalled) | (signalled) | (signalled) |
| 1 | 3 | [536, 536, 536] | [136, 68, 34] | [76, 38, 19] |
| 2 | 3 | [256, 512, 1024] | [136, 68, 34] | [76, 38, 19] |
| 3 | 3 | [512, 256, 128] | [136, 68, 34] | [76, 38, 19] |
| 4 - | | | (Reserved for future use) | | layer_cnt specifies the number of layers present in the frame.

fm_cnt[layer_idx] specifies the number of feature maps present for layer_idx.

fm_width[layer_idx] specifies the width of feature maps for layer_idx.

fm_height[layer_idx] specifies the height of feature maps for layer_idx.

orig_source_width specifies the width of the frame 112 in luma samples prior to resizing for backbone operation, i.e. prior to the resizer module 304.

orig_source_height specifies the height of the frame 112 in luma samples prior to resizing for backbone operation. i.e. prior to the resizer module 304.

packing_format specifies the format of packed feature map data in the frames, with formats enumerated in accordance with the following table:

| packing_format | Chroma format | Alignment | Padding | Group packing |
|---|---|---|---|---|
| 0 | 400 | 4 × 4 | N/A | N/A |
| 1 | 400 | None | N/A | N/A |
| 2 | 400 | 4 × 4 | N/A | Size 4 groups use sample-wise interleaving |
| 3 | 420 | 4 × 4 | N/A | N/A |
| 4 | 400 | | 2 samples | |
| 4 - | | | | (Reserved for future use) | grouping_type specifies the scope of the feature map groups by setting an ExplicitGrouping flag, an ExplicitGroupSize flag, and an ExplicitLayerId flag.

ExplicitGrouping flag equal to one indicates the feature map grouping is explicitly signalled in the bitstream and ExplicitGrouping flag equal to zero indicates the feature map grouping is implicitly determined based on grouping_type.

ExplicitGroupSize flag equal to one indicates the size of each feature map group is explicitly signalled in the bitstream and ExplicitGroupSize flag equal to zero indicates the size of each feature map group is implicitly determined based on grouping_type.

ExplicitLayerId flag equal to one indicates that a group may contain feature maps in different layers and ExplicitLayerId flag equal to zero indicates that a group implicitly is confined to a single layer.

The following table shows the values assigned to the flags ExplicitGrouping flag, ExplicitGroupSize flag, and ExplicitLayerId according to grouping_type, and where an implicit signalling is used the implicit behaviour is described.

| grouping_type | ExplicitGrouping | ExplicitGroupSize | ExplicitLayerId | Implicit rules |
|---|---|---|---|---|
| 0 | True | True | True | Fully flexible group assignment |
| 1 | True | True | False | Intra-layer grouping only, i.e. one or more groups, with each one contained within a given layer. |
| 2 | True | False | False | One group per layer with specified order |
| 3 | False | False | False | One group per layer with monotonically incrementing order, such that group_cnt = layer_cnt, and group_size[ layer_idx ] = fm_cnt[ layer_idx ]. |

| grouping_type | ExplicitGrouping | ExplicitGroupSize | ExplicitLayerId | Implicit rules |
|---|---|---|---|---|
| 4 | False | False | False | One group across all layers with monotonically incrementing order, such that: group_cnt = 1, and group_size = sum(fm_cnt[ ]). |
| 5 | True | False | True | Each group contains at most one feature map per layer. |
| 6 - | | | | (Reserved for future use) | group_cnt is present when ExplicitGrouping flag is equal to one and signals the number of feature map groups. When ExplicitGroupingFlag is equal to zero group_cnt is inferred based on grouping_type, in accordance with the above table.

quant_type indicates the type of quantisation operation in accordance with the following table:

| quant_type | SecondRangeFlag | Meaning |
|---|---|---|
| 0 | False | Symmetric quantisation: The quantisation range is equal to or represents (e.g. a scaled version with headroom added) the maximum magnitude within the respective feature map group. |
| 1 | True | Asymmetric quantisation: The quantisation range is equal to or represents (e.g. a scaled version with headroom added) the maximum positive and maximum negative value within the respective feature map group. |
| 2 - | | (Reserved for future use) | qr_fraction_precision specifies the precision at which the fraction portion of the floating point quantisation ranges are coded in bits.

group_size is present when ExplicitGrouping flag is equal to one and ExplicitGroupSize flag is equal to one. group_size specifies the size of group grp_idx. When group_size is not present it is inferred in accordance with the 'Implicit Rules described in the 'grouping_type' table.

fm_idx[grp_idx][fm_idx] specifies the feature map index, or channel index, of position fm_idx within group grp_idx.

layer_id[grp_idx][fm_idx], when present, specifies the layer index for the corresponding feature map identified in fm_idx[grp_idx][fm_idx]. When layer_idx is not present it is inferred. For group_type equal to 1, 2 or 3, feature maps in layer 0 are firstly assigned to one or more groups and once all feature maps in layer 0 have been assigned to groups then feature maps in layer 1 are assigned to one or more groups and so on. For group_type equal to 4, the one group contains all feature maps of all layers.

qr_exp[grp_idx] specifies the exponent portion of the quantisation range for group grp_idx.

qr_exp_sign[grp_idx] specifies the sign of the exponent portion of the quantisation range for group grp_idx.

qr_fraction[grp_idx] specifies the fraction portion of the quantisation range for group grp_idx, with a bit width as specified by qr_precision.

second_qr_exp[grp_idx], when present, specifies the exponent portion of the second quantisation range for group grp_idx.

second_qr_exp_sign[grp_idx] specifies the sign of the exponent portion of the quantisation range for group grp_idx.

second_qr_fraction[grp_idx], when present, specifies the fraction portion of the second quantisation range for group grp_idx, with a bit width as specified by qr_precision.

When quant_type is equal to zero the quantisation range indicates the maximum magnitude of values encountered within the feature maps within the group to which the quantisation range applies.

When quant_type is equal to one the quantisation range indicates the maximum positive value encountered within the feature maps within the group to which the quantisation range applies and the second quantisation range indicates the maximum negative value encountered within the feature maps within the group to which the second quantisation range applies.

The quantisation range and the second quantisation (if present) range may also have been adjusted to allow some headroom, such as by multiplication by a value slightly greater than 1.0. Such headroom allows quantisation ranges to be reused for frames subsequent to the frame associated with the feature map packing info SEI message with a reduced likelihood of needing to clip tensor values at the quantisation module 518.

The invention claimed is:

1. An encoding apparatus comprising:
a determining unit for determining whether to generate encoded data of a frame where a plurality of feature maps obtained based at least on processing an input image by a neural network is arranged; and
an encoding unit for generating encoded data of an input image using a plurality of functions including at least matrix intra prediction (MIP) in a case where the encoded data of the input image is to be generated instead of the frame where the plurality of feature maps is arranged,
wherein in a case where it is determined that the encoded data of the frame, where the plurality of feature maps is arranged, is to be generated, the encoding unit uses a first part of the plurality of functions but does not use a second part of the plurality of functions including matrix intra prediction (MIP).

2. The apparatus according to claim 1,
wherein, the second part of the plurality of functions includes at least one of LFNST, LMCS, and ISP.

3. The apparatus according to claim 1,
   wherein, the second part of the plurality of functions includes at least one of Affine, GPM, and MMVD.
4. The apparatus according to claim 1,
   wherein, the second part of the plurality of functions is constrained so as not to be used in generating the encoded data of the frame where the plurality of feature maps is arranged.
5. The apparatus according to claim 1, wherein, the encoding unit is configured to encode information which indicates that the second part of the plurality of functions is constrained so as not to be used in decoding the encoded data of the frame where the plurality of feature maps is arranged.
6. The apparatus according to claim 1, wherein the apparatus is for generating first encoded data and second encoded data, and wherein, the first encoded data is compliant with a first coding standard, the second encoded data is compliant with a second coding standard.
7. The apparatus according to claim 1,
   wherein each of the plurality of feature maps is arranged in the frame according to a raster-scan arrangement.
8. The apparatus according to claim 1, wherein a feature map having a first width and a first height among the plurality of feature maps is arranged in a first area, and a feature map having a second width smaller than the first width and a second height smaller than the first height among the plurality of feature maps is arranged in a second area of the frame, different from the first area.
9. The apparatus according to claim 1, wherein the plurality of feature maps is obtained by performing quantization on each of the plurality of feature maps that constitutes a tensor, which is obtained based at least on the processing of a neural network on the input image.
10. A decoding apparatus comprising:
    a determining unit for determining whether to decode encoded data of a frame where a plurality of feature maps obtained based at least on processing an input image by a neural network is arranged; and
    a decoding unit for decoding encoded data of an input image using a plurality of functions including at least matrix intra prediction (MIP) in a case where the encoded data of the input image is to be decoded instead of the frame where the plurality of feature maps is arranged,
    wherein in a case where it is determined that the encoded data of the frame, where the plurality of feature maps is arranged, is to be decoded, the decoding unit uses a first part of the plurality of functions but does not use a second part of the plurality of functions including matrix intra prediction (MIP).
11. The apparatus according to claim 10,
    wherein, the second part of the plurality of functions includes at least one of LFNST, LMCS, and ISP.
12. The apparatus according to claim 10,
    wherein, the second part of the plurality of functions includes at least one of Affine, GPM, and MMVD.
13. The apparatus according to claim 10,
    wherein, the second part of the plurality of functions are constrained so as not to be used in decoding the encoded data of the frame where the plurality of the feature maps is arranged.
14. The apparatus according to claim 10, wherein the decoding unit is configured to decode information which indicates that the second part of the plurality of functions is constrained so as not to be used in decoding the encoding data of the frame where the plurality of feature maps is arranged.
15. The method according to claim 10, wherein the apparatus is for generating first encoded data and second encoded data, and wherein, the first encoded data is compliant with a first coding standard, the second encoded data is compliant with a second coding standard.
16. The apparatus according to claim 10,
    wherein each of the plurality of feature maps is arranged in the frame according to a raster-scan arrangement.
17. The apparatus according to claim 10, wherein a feature map having a first width and a first height among the plurality of feature maps is arranged in a first area of the frame, and a feature map having a second width smaller than the first width and a second height smaller than the first height among the plurality of feature maps is arranged in a second area of the frame, different from the first area.
18. The apparatus according to claim 10, wherein the plurality of feature maps is obtained by performing quantization on each of the plurality of feature maps that constitutes a tensor, which is obtained based at least on the processing of a neural network on the input image.
19. A decoding method comprising:
    determining whether to decode encoded data of a frame where a plurality of feature maps obtained based at least on processing an input image by a neural network is arranged; and
    decoding encoded data of an input image using a plurality of functions including at least matrix intra prediction (MIP) in a case where the encoded data of the input image is to be decoded instead of the frame where the plurality of feature maps is arranged,
    wherein in a case where it is determined that the encoded data of the frame, where the plurality of feature maps is arranged, is to be decoded, using a first part of the plurality of functions and not using a second part of the plurality of functions including matrix intra prediction (MIP).
20. A non-transitory computer-readable storage medium which stores a program for executing a method of generating encoded data, the method comprising:
    determining whether to generate encoded data of a frame where a plurality of feature maps obtained based at least on processing an input image by a neural network is arranged; and
    generating encoded data of an input image using a plurality of functions
    including at least matrix intra prediction (MIP) in a case where the encoded data of the input image is to be generated instead of the frame where the plurality of feature maps is arranged,
    wherein in a case where it is determined that the encoded data of the frame, where the plurality of features maps is arranged, is to be generated, using a first part of the plurality of functions and not using a second part of the plurality of functions including matrix intra prediction (MIP).
21. A non-transitory computer-readable storage medium which stores a program for executing a method of decoding encoded data, the method comprising:
    determining whether to decode encoded data of a frame where a plurality of feature maps obtained based at least on processing an input image by a neural network is arranged; and
    decoding encoded data of an input image using a plurality of functions including at least matrix intra prediction (MIP) in a case where the encoded data of the input image is to be decoded instead of the frame where the plurality of feature maps is arranged, wherein in a case where it is determined that the encoded data of the frame, where the plurality of feature maps is arranged, is to be decoded, using a first part of the plurality of functions and not using a second part of the plurality of functions including matrix intra prediction (MIP).

22. An encoding method comprising:

determining whether to generate encoded data of a frame where a plurality of feature maps obtained based at least on processing an input image by a neural network is arranged; and generating encoded data of an input image using a plurality of functions including at least matrix intra prediction (MIP) in a case where the encoded data of the input image is to be generated instead of the frame where the plurality of feature maps is arranged, wherein in a case where it is determined that the encoded data of the frame, wherein the plurality of feature maps is arranged, is to be generated, using a first part of the plurality of functions and not using a second part of the plurality of functions including matrix intra prediction (MIP).

* * * * *